US012614500B2

(12) United States Patent
Akimoto

(10) Patent No.: US 12,614,500 B2
(45) Date of Patent: Apr. 28, 2026

(54) LIGHT-EMITTING DEVICE AND METHOD FOR DRIVING THE SAME

(71) Applicant: NICHIA CORPORATION, Anan (JP)

(72) Inventor: Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/989,147

(22) Filed: Dec. 20, 2024

(65) Prior Publication Data

US 2025/0209962 A1 Jun. 26, 2025

(30) Foreign Application Priority Data

Dec. 25, 2023 (JP) ................................ 2023-218220

(51) Int. Cl.
*G09G 3/20* (2006.01)
*G09G 3/32* (2016.01)

(52) U.S. Cl.
CPC ............ *G09G 3/2092* (2013.01); *G09G 3/32* (2013.01); *G09G 2300/0452* (2013.01); *G09G 2320/0242* (2013.01)

(58) Field of Classification Search
CPC ............................................ G09G 2320/0666
See application file for complete search history.

(56) References Cited

U.S. PATENT DOCUMENTS 10,885,834 B2 1/2021 Akimoto
2005/0200573 A1* 9/2005 Kwak ................. G09G 3/3233 345/76
2005/0259439 A1* 11/2005 Cull .................... G09G 3/3413 362/612
2010/0134512 A1* 6/2010 Kwon ................. G09G 3/3426 345/589
2013/0088850 A1* 4/2013 Kroell ...................... F21K 2/00 362/282
2016/0061396 A1* 3/2016 Bosua .................... F21K 9/238 362/231
2019/0266960 A1* 8/2019 Slavenburg ............. G09G 3/36
2021/0091268 A1 3/2021 Dierolf et al.

FOREIGN PATENT DOCUMENTS

JP 2006-344913 A 12/2006
JP 2007-080998 A 3/2007
JP 2010-008769 A 1/2010
JP 6788088 B2 11/2020
JP 2021-052168 A 4/2021

* cited by examiner

*Primary Examiner* — Nan-Ying Yang
(74) *Attorney, Agent, or Firm* — Foley & Lardner LLP

(57) ABSTRACT

A light-emitting device includes: a display comprising a plurality of pixels in which a plurality of first light-emitting elements each configured to emit light of a first light emission color and a plurality of second light-emitting elements each configured to emit light of a second light emission color different from the first light emission color are arranged in a predetermined pattern; and a lighting controller configured to supply a drive current to each of the plurality of first light-emitting elements and the plurality of second light-emitting elements and control a light emission period of each of the plurality of first light-emitting elements and the plurality of second light-emitting elements. The second light emission color of a second light-emitting element, of the plurality of second light-emitting elements, is variable in accordance with a drive current.

16 Claims, 15 Drawing Sheets

LIGHT-EMITTING DEVICE AND METHOD FOR DRIVING THE SAME

CROSS-REFERENCE TO RELATED APPLICATIONS

This application is based upon and claims priority to Japanese Patent Application No. 2023-218220, filed on Dec. 25, 2023, the entire contents of which are incorporated herein by reference.

BACKGROUND

The present disclosure relates to a light-emitting device and a method for driving the light-emitting device.

Displays and surface light-emitting devices using semiconductor light-emitting elements, such as LEDs and LDs, are used. Here, to manufacture a full-color LED display, it is generally necessary to arrange sub-pixels of at least the three colors of RGB for each of pixels. However, in such a configuration, because it is necessary to provide at least three times as many of the sub-pixels as the pixels, this configuration is not suitable for high definition, and there are problems such as high cost and a decrease in yield due to the increase in the number of LEDs.

On the other hand, a micro-LED display has been reported that causes a single LED element to emit multicolor light (see JP 2021-52168 A). However, with respect to configuring a display using such a multicolor light-emitting micro-LED, an actual circuit configuration and driving method have not yet been reported. For example, it has not been easy in the current technology of controlling a multicolor light-emitting micro-LED to emit light in all chromaticity ranges of RGB.

On the other hand, the related art has considered that three sub-pixels of RGB are required for one pixel. To implement high definition, the number of sub-pixels is desirably reduced. However, because luminance information is almost expressed by the colors of G and R, when all pixels have no light-emitting elements that emit light of in the colors of G and R, a pixel defect occurs. When the number of sub-pixels is reduced, there is a problem in that the definition is lowered.

It is an object of an aspect of the present disclosure to provide a light-emitting device that can reduce the number of light-emitting elements while maintaining high definition in configuring a light-emitting device, such as a display, using multicolor semiconductor light-emitting elements and a method for driving the light-emitting device. It is an object of another aspect to provide a light-emitting device in which the number of sub-pixels is reduced and a method for driving the light-emitting device. Note that the description of these objects does not exclude the existence of other objects. An aspect of the present disclosure does not necessarily achieve all of the objects. Other objects can be derived from the description of the specification, the drawings, and the claims of the present disclosure.

SUMMARY

A light-emitting device according to an aspect of the present disclosure includes a display including a plurality of pixels in which a plurality of first light-emitting elements each capable of emitting light of a first light emission color and a plurality of second light-emitting elements each capable of emitting light of a second light emission color different from the first light emission color are arranged in a predetermined pattern, and a lighting controller configured to supply a drive current to each of the plurality of first light-emitting elements and the plurality of second light-emitting elements and control a light emission period. The second light emission color of a second light-emitting element of the plurality of second light-emitting elements is variable in accordance with a drive current, and a pixel of the plurality of pixels is configured such that a first light-emitting element of the plurality of first light-emitting elements and the second light-emitting element are arranged to emit light with the light of the first light emission color and the light of the second light emission color.

A method for driving a light-emitting device according to another aspect of the present disclosure is for driving a light-emitting device including a display including a plurality of pixels in which a plurality of first light-emitting elements each capable of emitting light of a first light emission color and a plurality of second light-emitting elements each capable of emitting light of a second light emission color different from the first light emission color are arranged in a predetermined pattern, a light emission color of each of the plurality of second light-emitting elements being variable in accordance with a drive current, and a lighting controller configured to supply a drive current to each of the plurality of first light-emitting elements and the plurality of second light-emitting elements and control a light emission period, and includes providing the display including the plurality of pixels each configured such that a first light-emitting element of the plurality of first light-emitting elements and a second light-emitting element of the plurality of second light-emitting elements are arranged to emit light with the light of the first light emission color and the light of the second light emission color, and lighting, by the lighting controller, the plurality of first light-emitting elements and the plurality of second light-emitting elements by supplying a drive current to each of the plurality of first light-emitting elements and the plurality of second light-emitting elements and controlling a light emission period of each of the plurality of first light-emitting elements and the plurality of second light-emitting elements.

In accordance with the light-emitting device and the method for driving the light-emitting device according to the above aspects, multicolor light emission such as full-color light emission is enabled using a light-emitting element whose light emission color can be controlled in accordance with a drive current, and light emission colors are displayed separately in sub-pixels, so that a decrease in spatial definition can be suppressed.

DETAILED DESCRIPTION

Figure 1:
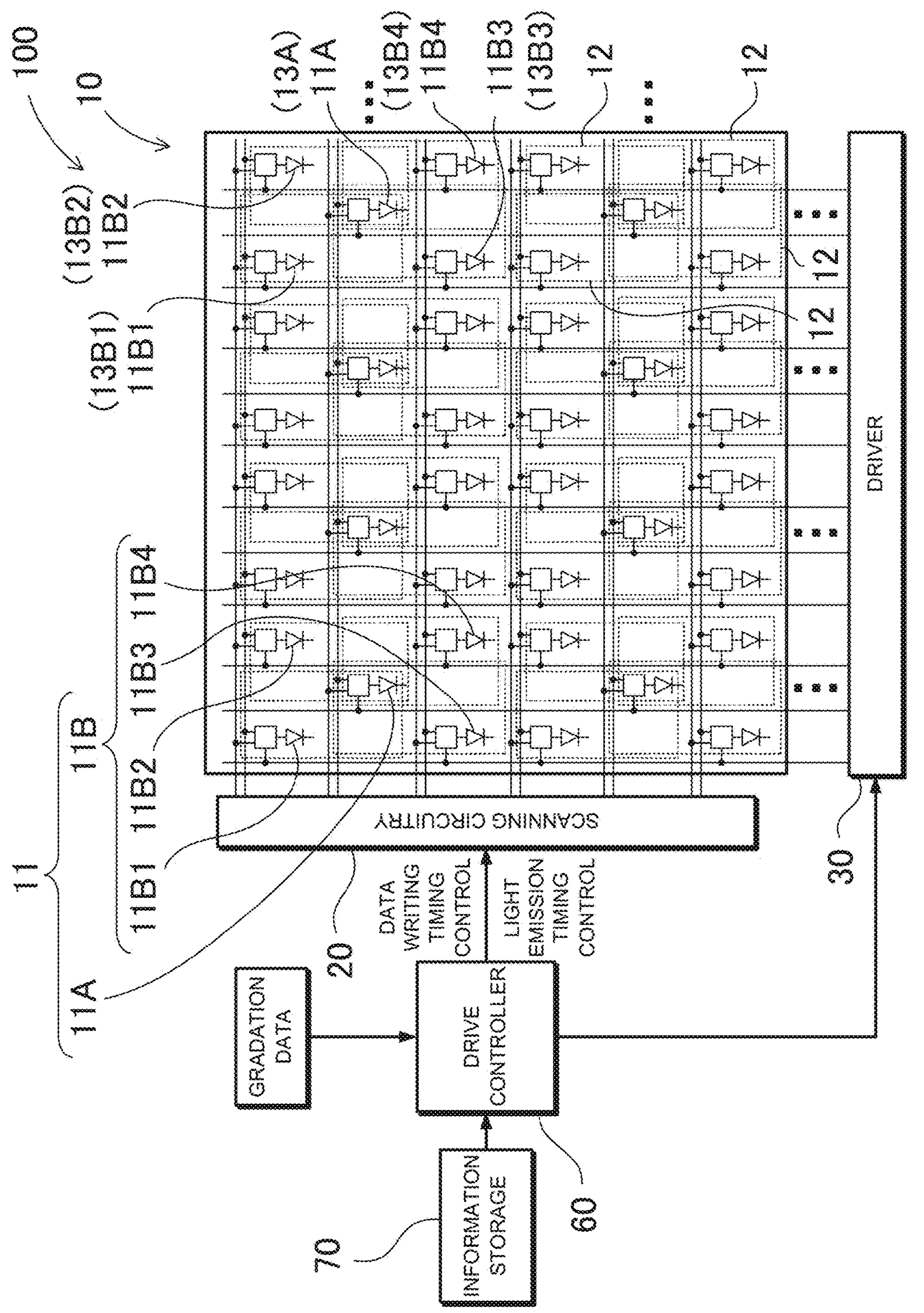
FIG. 1 is a block diagram illustrating a light-emitting device according to a first embodiment.

The present disclosure is described in detail below with reference to the drawings. In the following description, terms indicating specific directions and positions (for example, "upper", "lower", and other terms including these terms) are used as necessary; however, the use of these terms is to facilitate the understanding of the invention with reference to the drawings, and the technical scope of the present disclosure is not limited by the meaning of these terms. Parts having the same reference characters appearing in a plurality of drawings indicate identical or equivalent parts or members.

The following embodiments show specific examples of the technical idea of the present disclosure, and the present disclosure is not limited to the following embodiments. Unless otherwise specified, the dimensions, materials, shapes, relative arrangements, and the like of constituent elements to be described below are not intended to limit the scope of the present disclosure only thereto, but rather to provide examples. The contents to be described in an embodiment and an example can be applied to another embodiment and another example. The size, positional relationship, and the like of the members illustrated in the drawings can be exaggerated to clarify the explanation.

First Embodiment

Figure 2:
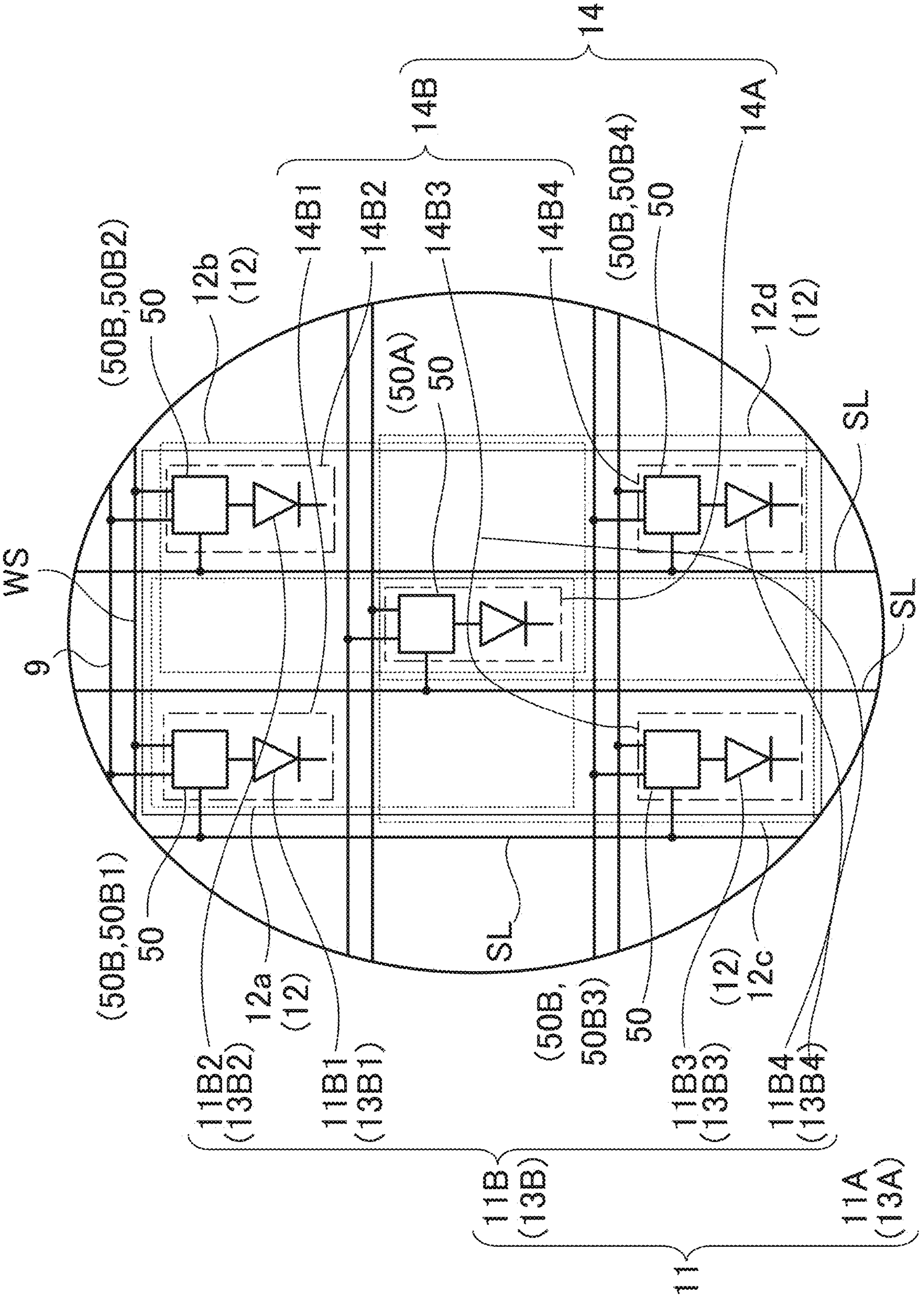
FIG. 2 is a schematic enlarged view of a display in FIG. 1.

A block diagram of a light-emitting device 100 according to a first embodiment is illustrated in FIG. 1, and an enlarged view of a display is illustrated in FIG. 2. The light-emitting device 100 illustrated in this drawing includes a display 10, a driver 30, a lighting controller 50, an information storage 70, a scanning circuitry 20, and a drive controller 60.

Display 10

The display 10 includes a plurality of pixels 12 in which a plurality of first light-emitting elements 11A and a plurality of second light-emitting elements 11B are arranged in a predetermined pattern. In the present disclosure, the first light-emitting elements 11A and the second light-emitting elements 11B may be collectively referred to as light-emitting elements 11. The plurality of first light-emitting elements 11A and second light-emitting elements 11B are arranged in a matrix. The light-emitting device 100 in FIG. 1 adopts an active matrix driving method as a lighting driving method for lighting each pixel 12.

Figure 3:
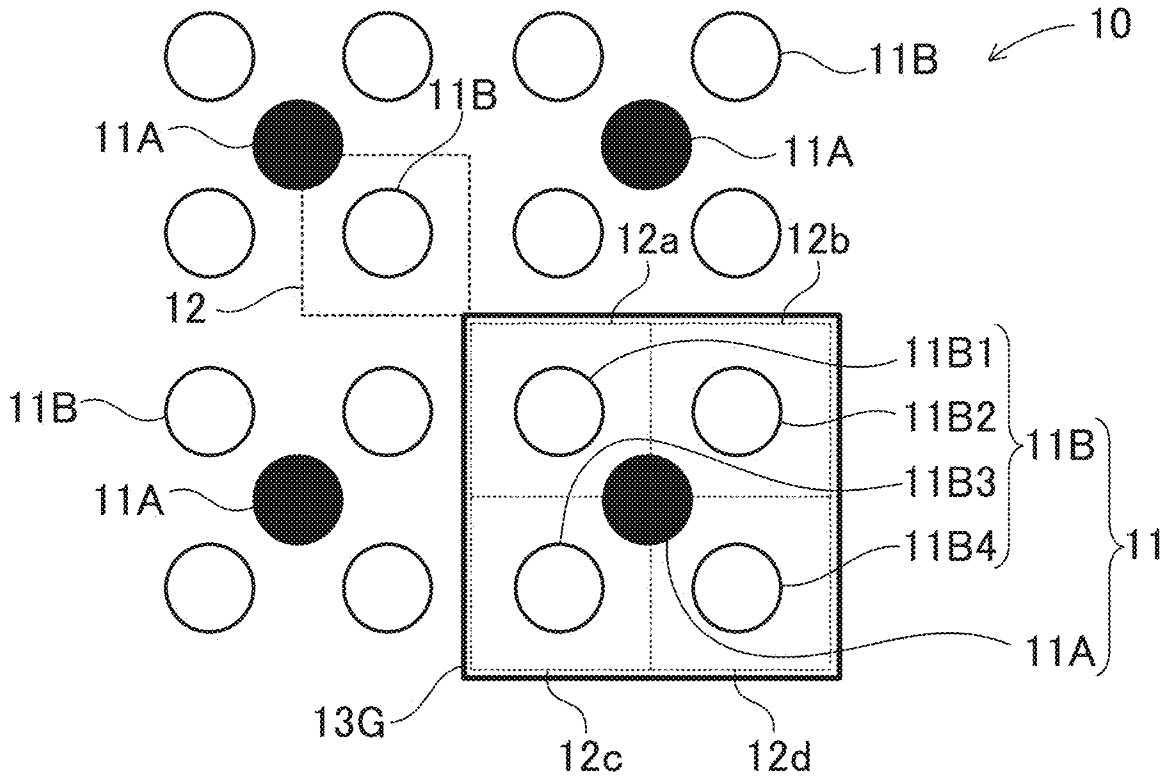
FIG. 3 is a schematic enlarged plan view illustrating a display in which a pixel is constituted by a first light-emitting element and a second light-emitting element.

In the display 10, at least one of the plurality of second light-emitting elements 11B are arranged for each pixel 12. On the other hand, each of the plurality of first light-emitting elements 11A straddles adjacent pixels 12. That is, in each pixel 12, one or more second light-emitting elements 11B are included, while the first light-emitting elements 11A are arranged in such a manner that the same first light-emitting elements 11A share a plurality of adjacent pixels. As a result, the number of first light-emitting elements 11A is conceptually one or less per pixel 12. In the example of FIG. 3, one pixel 12 includes one second light-emitting element 11B and a part of the first light-emitting element 11A anywhere arranged around the second light-emitting element 11B. As a result, the number of first light-emitting elements 11A per pixel is ¼, that is, 0.25. However, it does not mean that the number of first light-emitting elements is physically reduced to ¼, but merely means that one first light-emitting element is shared by a plurality of second light-emitting elements to form a plurality of pixels, and as a result, the number of first light-emitting elements per pixel is relatively reduced to 1 or less in calculation. In terms of display, one first light-emitting element 11A is shared by a plurality of pixels constituted by adjacent second light-emitting elements 11B. That is, because the light emission color of the first light-emitting element 11A is determined between adjacent pixels, one first light-emitting element 11A is not displayed with a light emission color or light emission luminance that is different by ¼. In addition, in the example of FIG. 3 and the like, although the first light-emitting element 11A seems to be equally divided into four parts due to the drawing in which the pixel is virtually represented by a square, one first light-emitting element 11A is merely shared by a plurality of pixels constituted by separate second light-emitting elements 11B in terms of actual display. For example, in FIG. 17 to be described below, because the pixels are drawn as rectangles, a state in which one first light-emitting element 11A is shared by three adjacent pixels is represented. In the present disclosure, the expression "the number of first light-emitting elements is 1 or less such as ¼" does not mean that the first light-emitting element is physically divided, and is used in the conceptual sense of the first light-emitting element being shared among a plurality of pixels, resulting in a calculated number of 1 or less. The first light-emitting element 11A and the second light-emitting elements 11B constituting one pixel 12 are referred to as sub-pixels. In other words, around each first light-emitting element 11A, a plurality of second light-emitting elements 11B, that is, four second light-emitting elements are disposed, namely, a second light-emitting element 11B1, a second light-emitting element 11B2, a second light-emitting element 11B3, and a second light-emitting element 11B4 are disposed. Specifically, a pixel 12*a* includes the first light-emitting element 11A and the second light-emitting element 11B1, a pixel 12*b* includes the first light-emitting element 11A and the second light-emitting element 11B2, a pixel 12*c* includes the first light-emitting element 11A and the second light-emitting element 11B3, and a pixel 12*d* includes the first light-emitting element 11A and the second light-emitting element 11B4.

The first light-emitting elements 11A can emit light of a first light emission color. The second light-emitting elements 11B can emit light of a second light emission color different from the first light emission color. Each pixel 12 in which the first light-emitting element 11A and the second light-emitting element 11B are arranged is expressed by a mixed color of the light of the first light emission color and the light of the second light emission color.

The first light emission color of the first light-emitting element 11A can be fixed wavelength light emission. On the other hand, the second light emission color of the second light-emitting element 11B can be tunable in accordance with a drive current of the second light-emitting element 11B. As the second light-emitting element 11B whose light emission color can be controlled in accordance with the drive current, a multicolor light-emitting wavelength-tunable LED can be suitably used.

In the light-emitting device 100 according to the first embodiment, the first light emission color is blue, and the second light emission color is tunable between green and red. The configuration can implement a display device that can emit light of various colors while reducing the number of necessary light-emitting elements by sharing a light-emitting element with an adjacent pixel without providing a blue sub-pixel in all pixels by using the fact that human visual sensitivity to blue is low.

Lighting Controller 50

The lighting controller 50 supplies a drive current to each of the plurality of first light-emitting elements 11A and the plurality of second light-emitting elements 11B to control a light emission period. In the example illustrated in the enlarged view of FIG. 2, the lighting controller 50 is connected to a power supply line 9 and a write scanning line WS extending in a horizontal direction. The lighting controller 50 is driven by power supplied from the power supply line 9, and receives timing for receiving a power supply control signal and an analog image signal via the write scanning line WS. On the other hand, the lighting controller 50 is also connected to a signal line SL extending in a vertical direction, and receives the power supply control signal and the analog image signal.

As described above, in the light-emitting device 100, the light-emitting element 11 constituting one pixel 12 is constituted by the first light-emitting element 11A that can emit light of the first light emission color and the second light-emitting element 11B that can emit light of the second light emission color The second light emission color is tunable, thereby suppressing the range of a necessary color change. A method for driving the light-emitting device 100 is described below. First, the display 10 is provided in which the first light-emitting element 11A and the second light-emitting element 11B are arranged so that each pixel 12 emits light with the first light emission color and light of the second light emission color. Subsequently, the lighting controller 50 supplies a drive current to each of the plurality of first light-emitting elements 11A and the plurality of second light-emitting elements 11B, and control the light emission period to light each of the plurality of first light-emitting elements 11A and the plurality of second light-emitting elements 11B. In this way, by limiting the light emission control of the second light-emitting element 11B that can emit light of different light emission colors in accordance with a drive current to light emission control that is tunable only in a limited range of wavelengths, for example, from green light to red light without controlling light emission in the entire range of RGB, multicolor light emission for each pixel 12 can be achieved in combination with the first light emission color of the first light-emitting element 11A, and simpler light emission control can be implemented.

The step of lighting, by the lighting controller 50, the plurality of first light-emitting elements 11A and the plurality of second light-emitting elements 11B may include a step of determining a chromaticity of the second light emission color and a luminance ratio of the first light-emitting element 11A and the second light-emitting element 11B from a chromaticity signal and a luminance signal to be displayed by the pixel 12 so as to correspond to the first light emission color, a step of determining a light emission intensity corresponding to a luminance signal to be displayed based on the chromaticity of the second light emission color and the luminance ratio, a step of supplying, by the first control circuit 51 of the lighting controller 50, a drive current having a value corresponding to a light emission color of each of the first light-emitting element 11A and the second light-emitting element 11B to the corresponding one of the first light-emitting element 11A and the second light-emitting element 11B by referring to the information storage 70, and a step of controlling, by the second control circuit 52 of the lighting controller 50, the light emission period of the drive current to be supplied by the first control circuit 51 in accordance with the determined light emission intensity.

The step of lighting, by the lighting controller 50, the plurality of first light-emitting elements 11A and the plurality of second light-emitting elements 11B may include a step of controlling, by the second control circuit 52, the light emission intensity by PWM control while keeping the drive current of each of the plurality of first light-emitting elements 11A constant in the first light-emitting element 11A, a step of controlling, by the first control circuit 51, the light emission color by a current value for driving each of the plurality of second light-emitting elements 11B in the second light-emitting element 11B, and a step of controlling, by the second control circuit 52, luminance by the light emission period of the current value of each of the plurality of second light-emitting elements 11B controlled by the first control circuit 51. Preferably, the state in which the drive current of the first light-emitting element 11A is constant means that the drive current is set to a current value under the drive conditions in which light-emitting efficiency is maximum.

Preferably, the lighting controller 50 sets a time width for supplying a current to the light-emitting element 11 based on the result of comparison between a first signal including a triangular wave signal and a first DC voltage set in a predetermined period. Based on a second DC voltage set in a period different from the predetermined period, a current value to be supplied to the lighting controller 50 is preferably controlled. The operation of the lighting controller 50 is described in detail below.

Pixel 12

Each pixel 12 is constituted by the first light-emitting element 11A and the second light-emitting element 11B. Each pixel 12 is configured to emit light with the first light emission color emitted by at least one first light-emitting elements 11A and light of the second light emission color emitted by at least one second light-emitting elements 11B.

In the display 10, the second light-emitting element 11B is disposed inside a quadrangular shape that defines each pixel 12, and the first light-emitting element 11A is disposed in at least one of the corners of the quadrangular shape. In other words, when the first light-emitting element 11A is regarded as the center, the periphery thereof is regarded as being surrounded by the plurality of second light-emitting elements 11B1, 11B2, 11B3, and 11B4. In the light-emitting device 100 according to the first embodiment, one pixel 12 is defined as indicated by a region surrounded by a broken line in FIG. 3. That is, it is defined that only about ¼ of the first light-emitting element 11A is present at any corner of the quadrangular pixel 12 with each second light-emitting element 11B at the center. As a result, the number of first light-emitting elements 11A occupying one pixel 12 is about ¼. The example of FIG. 3 illustrates a configuration in which the first light-emitting element 11A is arranged at any corner of the quadrangular shape defining each pixel 12; however, the present disclosure is not limited to such an arrangement. Because it is sufficient if the first light-emitting element straddles a plurality of adjacent pixels, the first light-emitting element may be disposed at a position other than the corner, for example, at the middle of a side of a rectangular shape. In addition, the pixel may have a polygonal shape such as a triangular shape or a hexagonal shape, or may have a circular shape. In this case as well, the arrangement position of the first light-emitting element may be a corner or a position other than the corner, for example, the center of a side.

In this way, in the example illustrated in FIG. 3, with respect to the second light-emitting elements 11B arranged in a matrix, the first light-emitting element 11A is arranged in a region surrounded by four second light-emitting elements 11B1, 11B2, 11B3, and 11B4 for each of the four second light-emitting elements 11B1, 11B2, 11B3, and 11B4. One pixel 12 is formed in a quadrangular shape surrounding each of the second light-emitting elements 11B. As a result, the first light-emitting element 11A is located at any of the corners of the quadrangle. By placing the first light-emitting element 11A at a position where four quadrangles each surrounding the second light-emitting element 11B are adjacent to one another, about ¼ of the first light-emitting element 11A placed at a position, where the four pixels 12*a*, 12*b*, 12*c*, and 12*d* are adjacent to one another, is allocated to one pixel 12. That is, one second light-emitting element 11B and about 0.25 first light-emitting element 11A are calculated to be one pixel 12, and thus the number of first light-emitting elements 11A constituting one pixel 12, that is, the number of sub-pixels can be reduced. In the present disclosure, the number of first light-emitting elements and the number of second light-emitting elements per pixel are not limited to this example. For example, the number of first light-emitting elements per pixel may be ½ or ⅓ (a detailed example is described below).

By relatively reducing the number of light-emitting elements constituting one pixel in this way, the light-emitting device can be simplified. In addition, high definition can also be achieved by increasing the number of pixels. In particular, in the related art, because three sub-pixels of RGB are required for one pixel to implement full-color display, there is a limit to high definition in a display with a limited area. In addition, because luminance information is substantially expressed by colors of G and R, when no G and R light-emitting elements exist in all the pixels, there is a problem in that a pixel defect occurs and a decrease in definition is caused.

On the other hand, in the present embodiment, the number of sub-pixels is reduced by paying attention to the difference in the visual sensitivity of the human eye with respect to each light emission color of RGB. Specifically, because the spatial resolution of blue light is lower than that of green light and red light in the human eye, blue light has a feature that a decrease in the definition is not perceived. In particular, because blue light carries only color information, the human visual sensitivity with respect to color information of blue light is low. Accordingly, even though not all pixels include light-emitting element emitting blue light, it is not perceivable by human beings. By using this property, the number of sub-pixels constituting each pixel 12 can be reduced by disposing one or more second light-emitting elements 11B for emitting green light or red light in each pixel 12 and disposing the first light-emitting elements 11A for emitting blue light across adjacent pixels 12.

Unit Sub-Pixel Group 13G

That is, a sub-pixel group, in which sub-pixels each including the second light-emitting element 11B or the first light-emitting element 11A are arranged adjacent to each other in a predetermined pattern, is periodically arranged in the display 10, and the first light-emitting element 11A is arranged in each of sub-pixel groups (hereinafter, referred to as "unit sub-pixel groups 13G") with a repetitive arrangement with the above predetermined pattern to extend across the pixel 12 constituted by the sub-pixel group. In other words, the unit sub-pixel group 13G is a repeating unit of the sub-pixels constituting the display 10, that is, the first light-emitting element 11A and the second light-emitting element 11B, the sub-pixel including one first light-emitting element 11A being a sub-pixel. When the relationship between the pixel and the light-emitting element is arranged in ascending order of concept, in the example illustrated in FIG. 2, the sub-pixel is constituted by the first light-emitting element or the second light-emitting element. The pixel is constituted by the first light-emitting element and one second light-emitting element. On the other hand, the sub-pixel group is constituted by the first light-emitting element and a plurality of second light-emitting elements. In FIG. 3, the unit sub-pixel group 13G is surrounded by a solid line. In the unit sub-pixel group 13G, one first light-emitting element 11A is arranged at an intersection of four pixels 12*a*, 12*b*, 12*c*, and 12*d* each including the second light-emitting element 11B arranged in a matrix. Because the unit sub-pixel group 13G includes the second light-emitting element 11B (four second light-emitting elements 11B1, 11B2, 11B3, and 11B4) and one first light-emitting element 11A, the total number of sub-pixels is 5. The present disclosure is not limited to this configuration, and one first light-emitting element may be arranged for every three or every two second light-emitting elements. That is, the unit sub-pixel group may include four sub-pixels or three sub-pixels instead of the five sub-pixels as illustrated in FIG. 3.

In addition, by using the same structure as that of the second light-emitting element that is a tunable light-emitting element for the first light-emitting element that emits blue light, that is, by making the first light-emitting element 11A and the second light-emitting element 11B tunable light-emitting elements, the manufacturing process can be simplified by using a common light-emitting element. Alternatively, by using, as the first light-emitting element, a known single-color blue light-emitting element that emits light at a fixed wavelength, and by using, as the second light-emitting element, a G-R tunable light-emitting element in which the tunable range of a light emission wavelength is limited to G-R, the yield in manufacturing the second light-emitting element can be improved. This is because the G-R tunable light-emitting element has a higher process likelihood in manufacturing than a B-G-R tunable light-emitting element.

The spatial position of a luminance point in the pixel 12 is determined by the second light-emitting element 11B. Accordingly, the second light-emitting elements 11B are desirably evenly arranged in a square shape, a delta-shape, or the like. On the other hand, the primary purpose of the first light-emitting elements 11A is to provide a chromaticity for each unit sub-pixel group 13G. Therefore, although the position of the first light emitting element 11A relative to the second light emitting element 11B is visually ideal that the first light-emitting element 11A is arranged at equal distances from all the second light-emitting elements in the unit sub-pixel group, the first light-emitting element 11A does not necessarily need to be arranged at equal distances from the surrounding second light-emitting elements 11B, and it is sufficient if the first light-emitting element 11A is arranged in a region near the pixel group.

Figure 4:
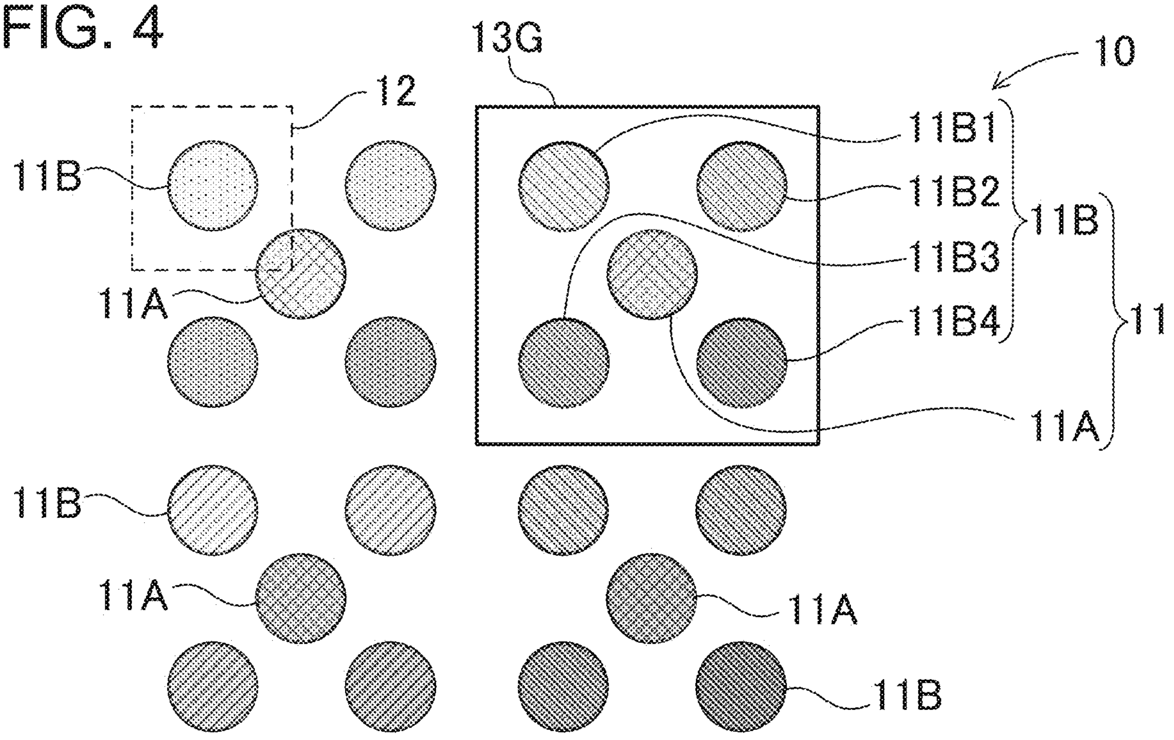
FIG. 4 is a schematic enlarged plan view illustrating a state in which light emission luminance of a unit sub-pixel group is changed in FIG. 3.

FIG. 3 illustrates an example of such a unit sub-pixel group 13G. In the display 10, sub-pixels constituting one pixel 12 include one sub-pixel of the second light-emitting element 11B and ¼ sub-pixel of the first light-emitting element 11A. In this case, the unit sub-pixel group 13G includes four pixels as surrounded by a solid line. In this way, because the first light-emitting element 11A is arranged at the boundary of the four square pixels 12 to emit blue light, four pixels including the four second light-emitting elements 11B1, 11B2, 11B3, and 11B4 surrounding the first light-emitting element 11A, that is, each second light-emitting element 11B belonging to the unit sub-pixel group 13G have the same light emission color as illustrated in FIG. 3. On the other hand, the light emission luminance of each of the second light-emitting elements 11B1, 11B2, 11B3, and 11B4 is made different for each pixel 12 as illustrated in FIG. 4. In FIG. 4, the second light-emitting elements 11B1, 11B2, 11B3, and 11B4 (the unit sub-pixel group 13G in a region indicated by a solid line in FIG. 4), which are sub-pixels surrounding each first light-emitting element 11A, have the same chromaticity but different luminance values. In FIG. 4, the difference in chromaticity is represented by a hatching pattern, and the difference in average luminance is represented by a difference in density by a gray scale.

Procedure for Determining Light Emission Color

As a procedure for determining the light emission color and the light emission luminance of each sub-pixel constituting the unit sub-pixel group 13G, the light emission color of the unit sub-pixel group 13G is first determined. When the light emission color of the unit sub-pixel group 13G is determined, because the light emission color of one first light-emitting element 11A constituting the unit sub-pixel group 13G has been determined in advance, the light emission colors of the four second light-emitting elements 11B1, 11B2, 11B3, and 11B4 are determined. That is, the light emission colors of the four second light-emitting elements 11B1, 11B2, 11B3, and 11B4 are the same as described above. Subsequently, the light emission luminance of each sub-pixel is determined.

Figure 5:
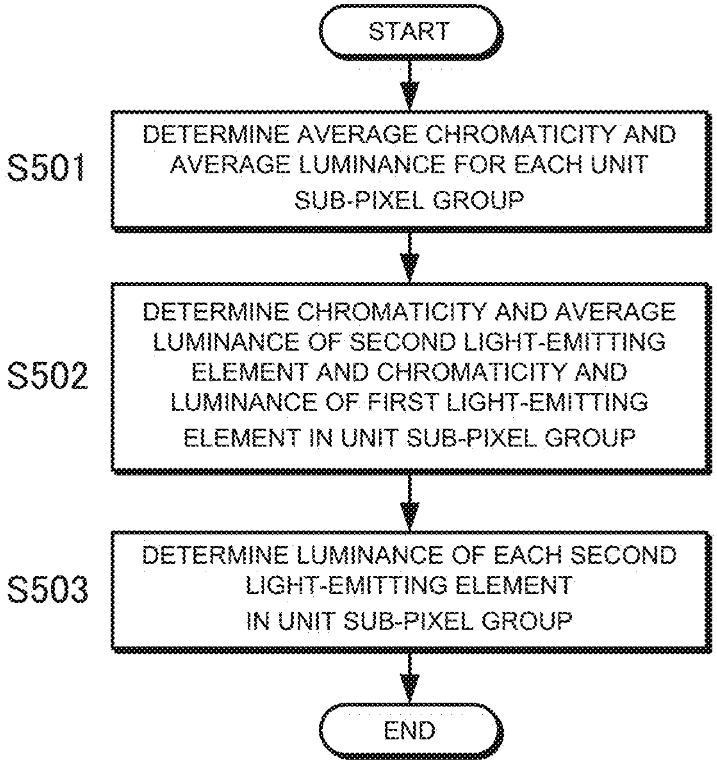
FIG. 5 is a flowchart illustrating a procedure for determining a drive current value and a light emission period of each sub-pixel.

A procedure for determining the drive current value and the light emission period of each sub-pixel is described with reference to the flowchart of FIG. 5.

First, in step S501, the average chromaticity and average luminance of video data (moving image or still image) to be displayed are determined for each unit sub-pixel group 13G. In the example of FIG. 3, with respect to a total of five light-emitting elements 11 including the first light-emitting element 11A and the four second light-emitting elements 11B1, 11B2, 11B3, and 11B4 surrounding the first light-emitting element 11A, which constitute the five sub-pixels being the unit sub-pixel group 13G, the average chromaticity and the average luminance are calculated for each unit sub-pixel group 13G. In this configuration, although the definition of chromaticity is reduced to ¼, because the color resolution of the human eye is lower than the luminance resolution, deterioration of image quality is not perceived.

Subsequently, in step S502, the average chromaticity and luminance of the second light-emitting elements 11B1, 11B2, 11B3, and 11B4 and the chromaticity and luminance of the first light-emitting element 11A in the unit sub-pixel group 13G are determined using a predetermined algorithm. The chromaticity of the first light-emitting element 11A is determined by a drive current value, and the luminance thereof is determined by a light emission period. Note that the second light-emitting elements 11B1, 11B2, 11B3, and 11B4 in the unit sub-pixel group 13G emit light with the same chromaticity at the same drive current value. In the example of FIG. 3, the second light-emitting elements 11B1, 11B2, 11B3, and 11B4 being the four sub-pixels emit light of the same color. The predetermined algorithm for determining the average chromaticity and luminance of the second light-emitting element 11B and the chromaticity and luminance of the first light-emitting element 11A is described below with reference to FIG. 11.

Finally, in step S503, the luminance of each sub-pixel belonging to the unit sub-pixel group 13G is determined. That is, the luminance of each of the second light-emitting elements 11B is allocated in accordance with the luminance of each sub-pixel belonging to the unit sub-pixel group 13G, and thus the luminance of each sub-pixel is determined. The luminance of the second light-emitting element 11B is determined by the light emission period. The light emission period of each of the second light-emitting elements 11B is allocated in accordance with the ratio of the luminance signals of the four sub-pixels being the second light-emitting elements 11B constituting the unit sub-pixel group 13G, and thus the light emission period of each pixel 12 is determined. After the chromaticity of each unit sub-pixel group 13G is determined in this way, the luminance of each pixel 12 can be determined.

First Light-Emitting Element 11A and Second Light-Emitting Element 11B

As the first light-emitting element 11A and the second light-emitting element 11B, a semiconductor light-emitting element such as a light-emitting diode (LED) or a semiconductor laser (LD) can be suitably used. As the LED, an LED in which one or more semiconductor layered bodies including light-emitting portions (hereinafter, also simply referred to as the “semiconductor layered body”) can be used. The semiconductor layered body has light-emitting characteristics, and such a semiconductor layered body is produced by layering a plurality of semiconductor layers, such as ZnS, SiC, GaN, GaP, InN, AlN, ZnSe, GaAsP, GaAlAs, InGaN, GaAIN, AlInGaP, AlInGaN or the like, on a substrate by liquid phase epitaxy, HVPE, or MOCVD, and forming an active layer on any one of the semiconductor layers. By selecting a material of the semiconductor layer and a mixed crystal ratio thereof, the light emission wavelength of the active layer can be selected variously from ultraviolet light to infrared light. In particular, in a case of a display device that can be suitably used outdoors, a semiconductor layered body that can emit light with high luminance is desired. Therefore, a nitride semiconductor is preferably selected as a material of a light-emitting portion that emits light with high luminance. For example, $In_XAl_YGa_{1-X-Y}N$ ($0 \le X \le 1$, $0 \le Y \le 1$, and $X+Y \le 1$) or the like can be used as the material of the light-emitting portion.

In the first embodiment, a semiconductor light-emitting element such as a light-emitting diode or a semiconductor laser is used as the first light-emitting element 11A and the second light-emitting element 11B. A micro-LED may also be used as the light-emitting diode. The micro-LED has a chip size of 5 μm to 100 μm, and suitably 10 μm to 50 μm in consideration of light emission efficiency.

The light emission color of the first light-emitting element 11A is fixed as the first light emission color. On the other hand, the light emission color of the second light-emitting element 11B is the second light emission color that is tunable. The second light-emitting element 11B emits light of a different light emission color in accordance with a drive current. For example, when driven by a first drive current, the second light-emitting element 11B emits light of a first light emission wavelength, for example red light, and when driven by a second drive current larger than the first drive current, the second light-emitting element 11B emits light of a second light emission wavelength shorter than the first light emission wavelength, for example greed light.

Each of the first light-emitting element 11A and the second light-emitting element 11B is connected to a plurality of write scanning lines WS and a plurality of signal lines SL. The first light-emitting element 11A and the second light-emitting element 11B are connected to one of the plurality of write scanning lines WS and one of the plurality of signal lines SL, respectively, and arranged in a matrix to constitute the display 10.

Scanning Circuitry 20

Figure 6:
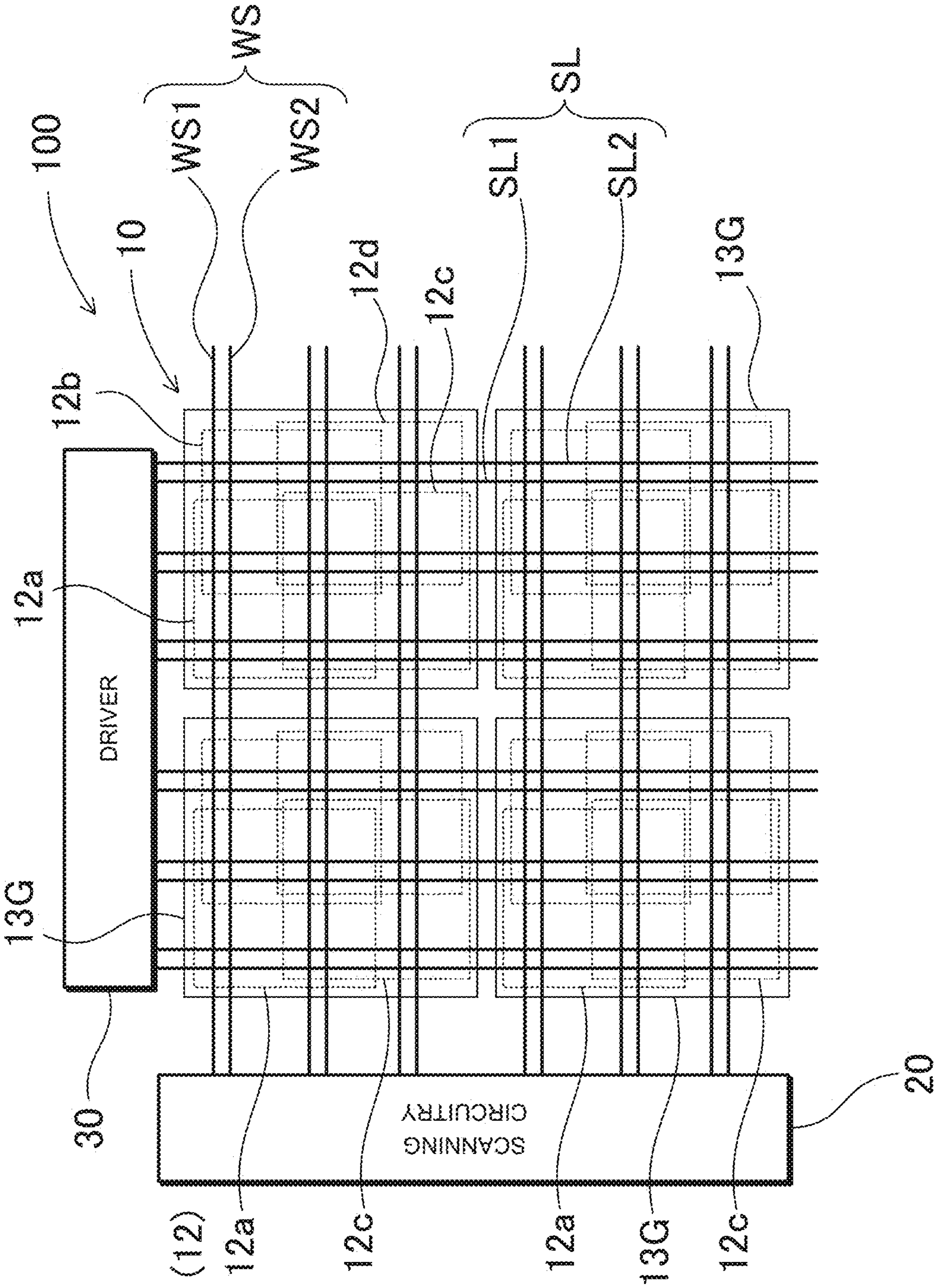
FIG. 6 is a block diagram illustrating of a display of the light-emitting device according to the first embodiment.
Figure 7:
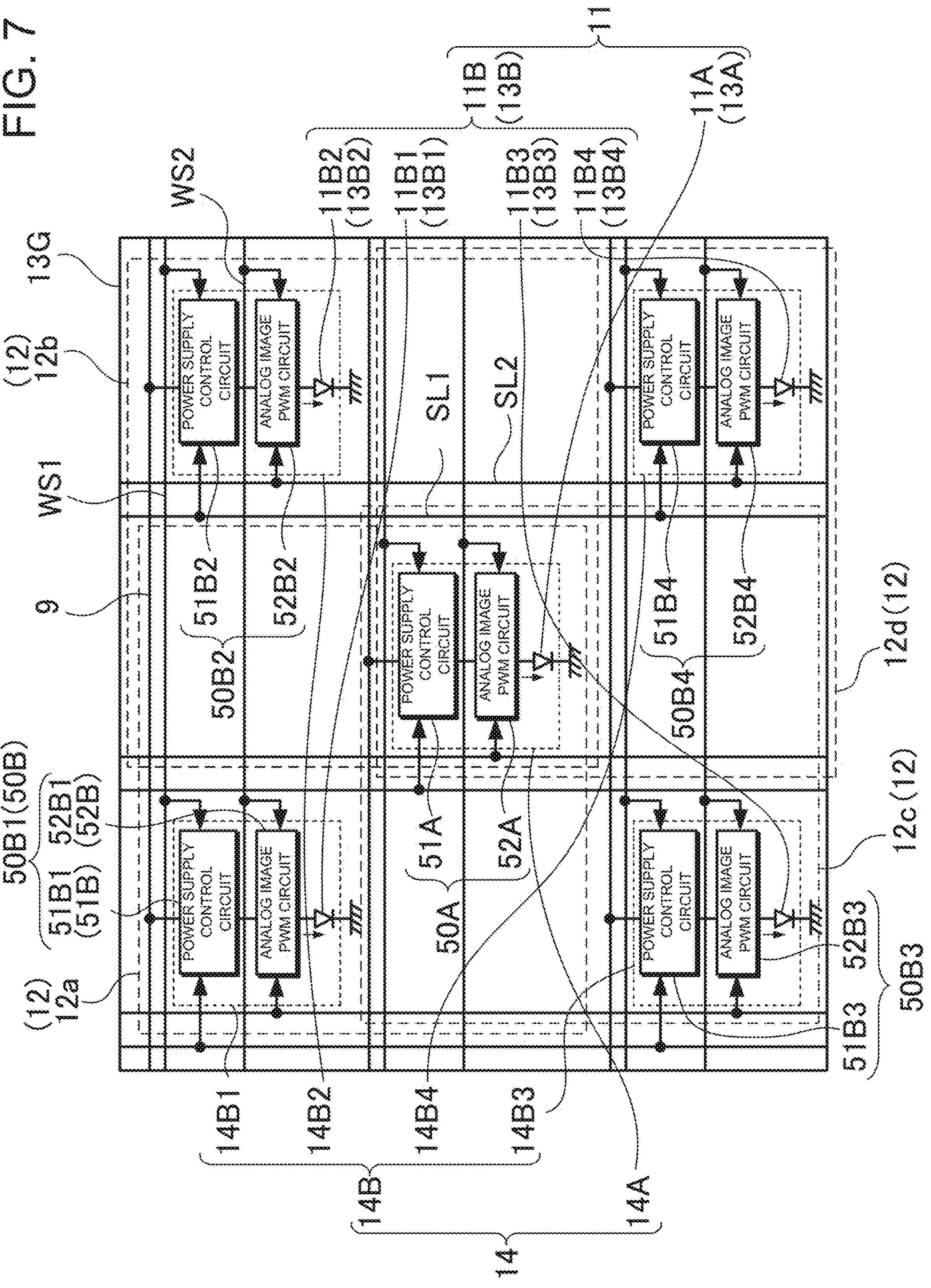
FIG. 7 is a schematic enlarged view of the display in FIG. 6.

The scanning circuitry 20 is provided in a further left column of the leftmost column of the pixels 12 arranged in a matrix. The scanning circuitry 20 may be provided in a further right column of the rightmost column of the pixels 12 arranged in a matrix. As illustrated in FIGS. 6 and 7, a power supply control signal write scanning line WS1 and an analog image signal write scanning line WS2 are provided for each row of the pixels 12 as the write scanning lines WS extending from the scanning circuitry 20. The power supply control signal write scanning line WS1 and the analog image signal write scanning line WS2 extend in the row direction.

The power supply control signal write scanning line WS1 supplies a first scanning signal being a digital signal for selecting a pixel circuit 14 (the lighting controller 50 and the light-emitting elements 11 in FIG. 1) in the row direction when a drive current value for determining a light emission color is written as a voltage value by the power supply control signal. The analog image signal write scanning line WS2 supplies a second scanning signal being a digital signal for selecting the pixel circuit 14 in the row direction when a light emission period determined by a light emission tone is written as a voltage value by the analog image signal.

Driver 30

In the driver 30, as illustrated in FIGS. 6 and 7, a power supply control signal line SL1 and an analog image signal line SL2 are extended as the signal lines SL in the vertical direction for each column of the pixels 12. The driver 30 supplies a power supply control signal to each pixel circuit 14 via the power supply control signal line SL1. The power supply control signal is an analog signal that can take a plurality of voltage values. The driver 30 supplies an analog image signal to each pixel circuit 14 via the analog image signal line SL2. The analog image signal is also an analog signal that can take a plurality of voltage values. Each pixel circuit 14, to which the power supply control signal is supplied and the voltage value is written, sets a drive current based on the written voltage value. Each pixel circuit 14, to which the analog image signal is supplied and the voltage value is written, sets a threshold voltage to be compared with a reference triangular wave signal based on the voltage value of the analog image signal, and sets a time width during which the pixel circuit 14 emits light. During a light emission period, the reference triangular wave signal (not illustrated) is supplied to the pixel circuit 14, and the light-emitting element 11 of each pixel circuit 14 emits light during an ON period based on a written analog image signal voltage. The drive current value when the light-emitting element 11 emits light is set by a power supply control signal voltage (for details, refer to U.S. patent Ser. No. 10/885,834).

The driver 30 may generate the reference triangular wave signal to be supplied to each pixel circuit 14 for each column. Alternatively, the reference triangular wave signal may be separately provided as a reference triangular wave circuit in a row lower than the lowermost row of the matrix of the pixel circuits 14. The driver 30 or the reference triangular wave circuit distributes, for example, a reference triangular wave supplied from the outside of these circuits to the columns of the pixel circuits 14.

The driver 30 may include a storage unit. The storage unit can store chromaticity settings for a plurality of voltage values taken by the power supply control signal and luminance settings for a plurality of voltage values taken by the analog image signal. The relationship between the voltage values and the luminance settings can be adjusted and set by visually checking the luminance of the light-emitting element 11 constituting the pixel circuit 14. The γ correction can be performed by appropriately setting the relationship between the voltage values and the luminance settings. While gradation characteristics become linear in a well-known digital PWM system, the fact that the γ correction can be applied to a signal is one of the advantages of this system. The storage unit is formed by, for example, an electrically rewritable storage circuit or the like.

Pixel Circuit 14

The pixel circuit 14 can be provided for each sub-pixel constituting one pixel 12. In the example of FIG. 2, the pixel circuit 14 includes a first sub-pixel circuit 14A and a second sub-pixel circuit 14B. The first sub-pixel circuit 14A drives the first light-emitting element 11A constituting a first sub-pixel 13A. On the other hand, the second sub-pixel circuit 14B drives the second light-emitting element 11B constituting a second sub-pixel 13B. In the example of FIG. 2, the first light-emitting element 11A as the first sub-pixel 13A is allowed to emit blue light and the second light-emitting element 11B as the second sub-pixel 13B is allowed to emit green to red light, so that the first sub-pixel 13A and the second sub-pixel 13B constitute one pixel 12. In the example of FIG. 2, the second sub-pixel 13B includes a plurality of second sub-pixels 13B1, 13B2, 13B3, and 13B4. The second sub-pixel circuit 14B includes a plurality of second sub-pixel circuits, specifically, a second sub-pixel circuit 14B1, a second sub-pixel circuit 14B2, a second sub-pixel circuit 14B3, and a second sub-pixel circuit 14B4.

Information Storage 70

As described above, the second light-emitting element 11B is a multicolor light-emitting wavelength-tunable LED, and changes the second light emission color in accordance with a drive current. Therefore, a drive current value for driving the second light-emitting element 11B is to be determined in accordance with the second light emission color to be emitted by the second light-emitting element 11B. Therefore, the information storage 70 stores current-chromaticity information indicating a correspondence relationship that determines the light emission color to be emitted by the second light-emitting element 11B and a drive current value for emitting this color. The drive controller 60 refers to the information storage 70 and determines the drive current of the second light-emitting element 11B corresponding to the second light emission color. The information storage 70 may include, for example, a storage element such as a current-chromaticity data memory for storing current-chromaticity data of the second light-emitting element 11B.

The information storage 70 may also store current-chromaticity information based on an actually measured value of each second light-emitting element 11B arranged in the display 10, and store current-chromaticity information generated by measuring a drive current and a light emission color of a light-emitting element equivalent to each second light-emitting element arranged in the display. Alternatively, the information storage may store current-chromaticity information that is recorded by statistically determining the relationship between the drive current and the light emission color of the second light-emitting element. In the example of FIG. 1, the information storage 70 has a light emission chromaticity-drive current-luminance characteristic table of (G-R). Here, (G-R) means a wavelength range from green light to red light.

Drive Controller 60

Figure 9:
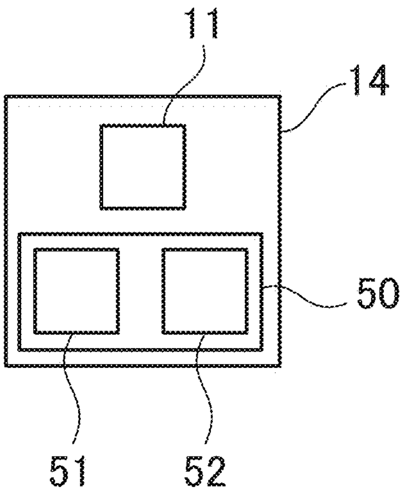
FIG. 9 is a block diagram illustrating an example in which a first control circuit and a second control circuit are provided in a pixel circuit.

The drive controller 60 further controls the operations of the scanning circuitry 20 and the driver 30. The scanning circuitry 20 and the driver 30 control the lighting controller 50 of each pixel 12. As illustrated in FIG. 9, each lighting controller 50 can include a first control circuit 51 and a second control circuit 52. The first control circuit 51 supplies a drive current to each of the first light-emitting element 11A and the second light-emitting element 11B. The second control circuit 52 controls the light emission periods of each of the first light-emitting element 11A and the second light-emitting element 11B. A configuration in which the light-emitting element 11 is connected to the lighting controller 50 may be referred to as the "pixel circuit 14". The first control circuit 51 is connected between the power supply line and the second control circuit 52. At least one first control circuit 51 and at least one second control circuit 52 are preferably provided for each pixel 12.

The drive controller 60 controls the driver 30 to supply the drive current to each of the first light-emitting element 11A and the second light-emitting element 11B so that each of the first light-emitting element 11A and the second light-emitting element 11B emit light with a specific light emission color and light emission luminance. Because the first light emission color of the first light-emitting element 11A is fixed, the drive controller 60 is controlled so that a predetermined drive current is supplied. On the other hand, for the second light-emitting element 11B, the drive controller 60 determines a drive current value for driving each second light-emitting element 11B and an ON period, during which each second light-emitting element 11B emits light, by referring to the current-chromaticity information stored in the information storage 70 in accordance with a specific light emission color and gradation information for each second light-emitting element 11B, and performs the lighting driving of each second light-emitting element 11B by using the drive current from the lighting controller 50.

The drive controller 60 also performs gradation control of the light emission luminance. For example, the drive controller 60 determines the drive current value of each of the first light-emitting element 11A and the second light-emitting element 11B by referring to the current-chromaticity information in accordance with the specific light emission color of each of the first light-emitting element 11A and the second light-emitting element 11B, and determines the ON period of each of the first light-emitting element 11A and the second light-emitting element 11B in accordance with the determined drive current value and with the specific gradation information for each of the first light-emitting element 11A and the second light-emitting element 11B.

The drive controller 60 may include a storage unit, similar to the drive unit 30 described above. The storage unit can store chromaticity settings for a plurality of voltage values taken by the power supply control signal and luminance settings for a plurality of voltage values taken by the analog image signal. The relationship between the voltage values and the luminance settings can be adjusted and set by visually checking the luminance of the light-emitting element 11 constituting the pixel circuit 14. The γ correction can be performed by appropriately setting the relationship between the voltage values and the luminance settings. While gradation characteristics become linear in a digital PWM system, the fact that the γ correction can be applied to a signal is one of the advantages of this system. The storage unit is formed by, for example, an electrically rewritable storage circuit or the like.

The drive controller 60 may further cause the driver 30 to simultaneously perform lighting control of the first light-emitting element 11A and the second light-emitting element 11B in a state in which ON period information corresponding to one screen of each of the first light-emitting element 11A and the second light-emitting element 11B constituting the display 10 is written into the storage unit.

The drive controller 60 determines a drive current value for driving each first light-emitting element 11A and a light emission period, during which each first light-emitting element 11A emits light, in accordance with light emission color information and gradation information of a display image given from the outside. The drive controller 60 determines a drive current value for driving each second light-emitting element 11B and a light emission period, during which each second light-emitting element 11B emits light, by referring to the current-chromaticity information stored in the information storage 70. Subsequently, the drive controller 60 causes the lighting controller 50 to perform lighting driving of each of the first light-emitting element 11A and the second light-emitting element 11B via the driver 30. With such a configuration, the lighting control of the display 10 constituted by the first light-emitting element 11A of a fixed wavelength type and the second light-emitting element 11B of a multicolor light-emitting type can be implemented.

With respect to the second light emission color of the second light-emitting elements 11B, when drive current values for emitting respective light emission colors of red (R), green (G), and blue (B) are IR, IG, and IB, respectively, the magnitude of the drive current values satisfies IR<IG<IB. Therefore, when the light emission periods of the maximum gradation of the respective colors are TR, TG, and TB, the relationship between the lengths of the maximum light emission periods of the respective colors during white display corresponding to full lighting satisfies TR>TG>TB.

However, when the second light emission color is varied in the entire range of R, G, and B, because the range in which the drive current of the second light-emitting element 11B is changed is widened, the control thereof is complicated. Therefore, by making the first light emission color and the second light emission color different from each other and causing the first light-emitting element 11A to responsible for the first light emission color, the range of the second light emission color for which the second light-emitting elements 11B is responsible can be limited, so that the control can be simplified. As for the assignment of the first light emission color and the second light emission color, preferably, the first light emission color is blue and the second light emission color is tunable from green to red or the second light emission color is blue to green and the first light emission color is red so that the second light emission color can be continuously changed. Among them, because the drive current value (IB) for blue light emission is the maximum for the drive current value of the multicolor light-emitting type LED, the drive current value of the second light-emitting element 11B can be more preferably suppressed by setting the first light emission color to blue and the second light emission color to green to red.

Accordingly, in the light-emitting device 100 according to the first embodiment, the first light-emitting element 11A emits blue light of the first light emission color, and the second light-emitting element 11B emits light of any color from green to red (G-R) of the second light emission color. Thus, full-color light emission can be implemented by the first light-emitting element 11A and the second light-emitting element 11B while improving the resolution of luminance without spatially reducing the resolution of color. PWM can be used for the gradation control of each of the light emission colors. Here, products of the maximum light emission periods and the drive current values by the PWM driving satisfy R>G>B. This is because light emission luminance efficiency of the second light-emitting element 11B is higher in the order of R<G<B.

Timing Chart

Figure 8:
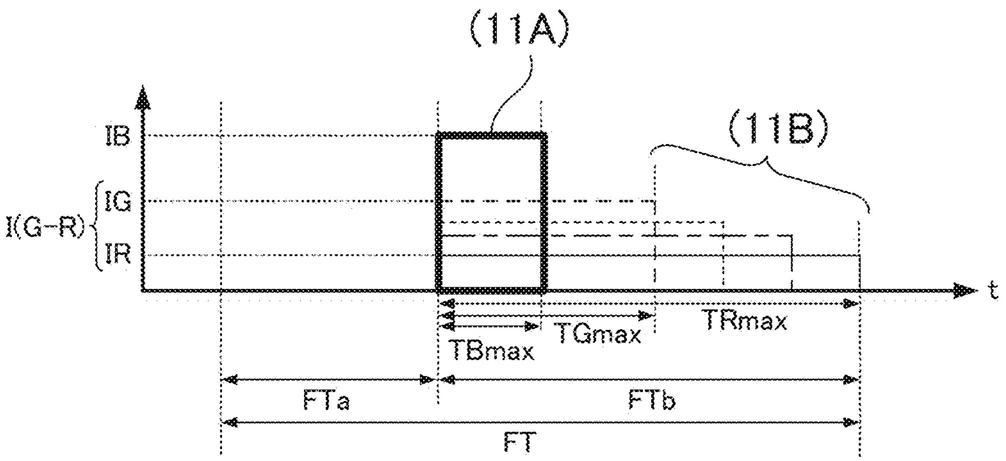
FIG. 8 is a timing chart illustrating the lighting timing of a first light-emitting element and a second light-emitting element.

FIG. 8 is a timing chart illustrating the lighting timing of each color when tunable light-emitting elements having the same structure are used for the first light-emitting element 11A and the second light-emitting element 11B in the light-emitting device 100 of FIG. 2. In this drawing, a vertical axis represents a drive current value supplied to each of the first light-emitting element 11A and the second light-emitting element 11B, and a horizontal axis represents an energization period. One frame period FT of an image to be displayed by the light-emitting device 100 is divided into a period FTa in which video information is sequentially written to each pixel and a light emission period FTb of a pixel unit. In the light emission period FTb of the pixel unit, the first light-emitting element 11A being a tunable light-emitting element is fixed to a constant light emission color (here, blue light) at a constant drive current value IB and caused to emit light. On the other hand, PWM control is performed to adjust the light emission luminance, that is, the gradation, by controlling the energization time (that is, a light emission period TB) during which the drive current having a value IB is supplied to the first light-emitting element 11A. In FIG. 8, the maximum light emission period of blue light is indicated by TBmax, and a drive current value when the first light-emitting element 11A is turned on for the maximum light emission period TBmax of blue light is indicated by a thick line. The gradation is expressed by adjusting an energization period during which light is turned on in the maximum light emission period TBmax by the PWM control.

On the other hand, in the light emission period FTb of the pixel unit, the second light-emitting element 11B is also caused to emit light simultaneously with the first light-emitting element 11A. Because an emission color of the second light-emitting element 11B is changed from green to red, a variable drive current having value I (G-R) is supplied to the second light-emitting element 11B in a range from a drive current value IG corresponding to green light, for example, 515 nm, to a drive current value IR corresponding to red light, for example, 630 nm. In other words, the second light-emitting element 11B controls a light emission color by the vertical axis (drive current) in FIG. 8. In addition, PWM control is performed by controlling the energization time (that is, the light emission period T (G-R)) during which the drive current having a value I (G-R) is supplied to the second light-emitting element 11B. In FIG. 8, the maximum light emission period of green light is indicated by TGmax, the maximum light emission period of red light is indicated by TRmax, a drive current value when the second light-emitting element 11B is turned on for the maximum light emission period TGmax of green light is indicated by a broken line, and a drive current value when the second light-emitting element 11B is turned on for the maximum light emission period TRmax of red light is indicated by a thin line. As described above, IR<IG<IB is satisfied on the vertical axis and TBmax<TGmax<TRmax is satisfied on the horizontal axis. Although an example in which the first light-emitting element 11A is a tunable light-emitting element has been described here, the first light-emitting element 11A may be a fixed-wavelength light-emitting element as described above. In this case, the drive current value IB is not necessarily larger than IG.

The above description is given on the assumption that the second light emission color of the second light-emitting element 11B can be varied in the entire range of R, G, and B; however, by manufacturing the second light-emitting element 11B so that the second light emission color can be varied only in the range from R to G, advantages such as simplification of a manufacturing process and cost reduction is obtained. For example, the manufacturing process margin of the second light-emitting element 11B can be made wider.

In the lighting control for each frame by the driver 30, a current value corresponding to blue light, for example, 470 nm, is supplied to the first light-emitting element 11A that emits blue light. In addition, a drive current is supplied to the second light-emitting element 11B in a range from a current value corresponding to green light, for example, 515 nm, to a current value corresponding to red light, for example, 630 nm, to change light from green light to red light. That is, the first light-emitting element 11A is supplied with a maximum current value for emitting blue light, while the second light-emitting element 11B is supplied with a drive current corresponding to the second light emission color to be emitted. In other words, the light emission color of the second light-emitting element 11B is controlled in accordance with a drive current thereof.

A pixel signal writing period is provided in each subframe, and PWM control is performed after the pixel signal writing period. In the pixel signal writing period, a pixel signal for one screen of each of the first light-emitting element 11A and the second light-emitting element 11B is written to a pixel memory. The driver 30 controls lighting of the light-emitting element 11 by referring to the pixel signal written to the pixel memory. The pixel memory is provided in the lighting controller 50 of the pixel circuit 14.

As illustrated in FIG. 9, the lighting controller 50 includes the first control circuit 51 and the second control circuit 52. The first control circuit 51 performs current driving in accordance with a light emission color. The second control circuit 52 performs PWM control. Specifically, in performing the PWM control, the second control circuit 52 sets a time width for supplying a current to the light-emitting element 11 based on the result of comparison between a first signal including a triangular wave signal and a first DC voltage being an analog image signal set in a predetermined period. Based on a second DC voltage being a power supply control signal set in a period different from the predetermined period, the first control circuit 51 controls a current value supplied by the lighting controller 50.

As illustrated in FIGS. 6 and 7, the power supply control signal write scanning line WS1 and the analog image signal write scanning line WS2 extend from the scanning circuitry 20, and are connected to each pixel 12. The power supply control signal line SL1 and the analog image signal line SL2 extend from the driver 30, and are connected to each pixel 12. The driver 30 is a driver IC that processes a power supply control signal and an analog image signal. The power supply control signal write scanning line WS1 and the analog image signal write scanning line WS2 are connected to the pixel circuit 14 being a TFT circuit provided on a mounting substrate. The TFT is made of low-temperature polycrystalline Si or an oxide semiconductor.

Each pixel 12 includes a plurality of sub-pixels as illustrated in an enlarged view of main components of FIGS. 2 and 7. The pixel 12 includes five sub-pixels: the first sub-pixel 13A and the second sub-pixels 13B1, 13B2, 13B3, and 13B4. Each sub-pixel includes the light-emitting element 11. The lighting controller 50 is connected to the light-emitting element 11. As described above, in accordance with the definition of the pixel circuit as the lighting controller and the light-emitting element, the sub-pixel circuit is specifically described below as the lighting controller and the light-emitting element (constituting the sub-pixel). Specifically, the first sub-pixel circuit 14A includes a first lighting controller 50A and the first light-emitting element 11A that constitutes the first sub-pixel 13A. The second sub-pixel circuit 14B includes a second lighting controller 50B and the second light-emitting element 11B that constitutes the second sub-pixel 13B. Specifically, the second sub-pixel circuit 14B1 includes a second lighting controller 50B1 and the second light-emitting element 11B1 that constitutes the second sub-pixel 13B1. The second sub-pixel circuit 14B2 includes a second lighting controller 50B2 and the second light-emitting element 11B2 that constitutes the second sub-pixel 13B2. The second sub-pixel circuit 14B3 includes a second lighting controller 50B3 and the second light-emitting element 11B3 that constitutes the second sub-pixel 13B3. The second sub-pixel circuit 14B4 includes a second lighting controller 50B4 and the second light-emitting element 11B4 that constitutes the second sub-pixel 13B4.

Each pixel circuit 14 includes the lighting controller 50. The first lighting controller 50A includes a first control circuit 51A and a second control circuit 52A. The second lighting controller 50B includes a first control circuit 51B and a second control circuit 52B. Specifically, the pixel circuit 14 includes the first sub-pixel circuit 14A and the second sub-pixel circuit 14B, and the second sub-pixel circuit 14B includes the second sub-pixel circuit 14B1, the second sub-pixel circuit 14B2, the second sub-pixel circuit 14B3, and the second sub-pixel circuit 14B4. Of these, in the first sub-pixel circuit 14A, the first lighting controller 50A includes the first control circuit 51A and the second control circuit 52A as described above. On the other hand, in the second sub-pixel circuit 14B1, the second lighting controller 50B1 includes a first control circuit 51B1 and a second control circuit 52B1. In addition, in the second sub-pixel circuit 14B2, the second lighting controller 50B2 includes a first control circuit 51B2 and a second control circuit 52B2. Moreover, in the second sub-pixel circuit 14B3, the second lighting controller 50B3 includes a first control circuit 51B3 and a second control circuit 52B3. Moreover, in the second sub-pixel circuit 14B4, the second lighting controller 50B4 includes a first control circuit 51B4 and a second control circuit 52B4.

The first control circuits 51A and 51B supply drive currents to the first light-emitting element 11A and the second light-emitting element 11B, respectively. On the other hand, the second control circuits 52A and 52B control the light emission periods of the first light-emitting element 11A and the second light-emitting element 11B, respectively. The first control circuits 51A and 51B are power supply control circuits, and the second control circuits 52A and 52B are analog image PWM circuits. The first control circuits (power supply control circuits) 51A and 51B are connected to the power supply line 9 and the power supply control signal line SL1. A power supply control signal write timing is input from the power supply control signal write scanning line WS1. On the other hand, the second control circuits (analog image PWM circuits) 52A and 52B are connected in series to the power supply line 9 via the first control circuits 51A and 51B, respectively. The second control circuits 52A and 52B are also connected to the analog image signal line SL2. An analog image signal write timing is input from the analog image signal write scanning line WS2. In this way, each of the light-emitting elements 11 is connected to the power supply line 9 via the power supply control circuit and the analog image PWM circuit. A drive current value is controlled by the power supply control circuit, and a drive time is controlled by the analog image PWM circuit.

FIG. 7 illustrates an example in which the first sub-pixel 13A includes one LED; however, the present disclosure is not limited to this configuration and each sub-pixel may include a plurality of light-emitting elements such as LEDs. For example, when a plurality of light-emitting elements are used for the purpose of increasing luminance or the like, two or more light-emitting elements may be connected in series or parallel. The same applies to the second sub-pixel.

LED

Figure 10:
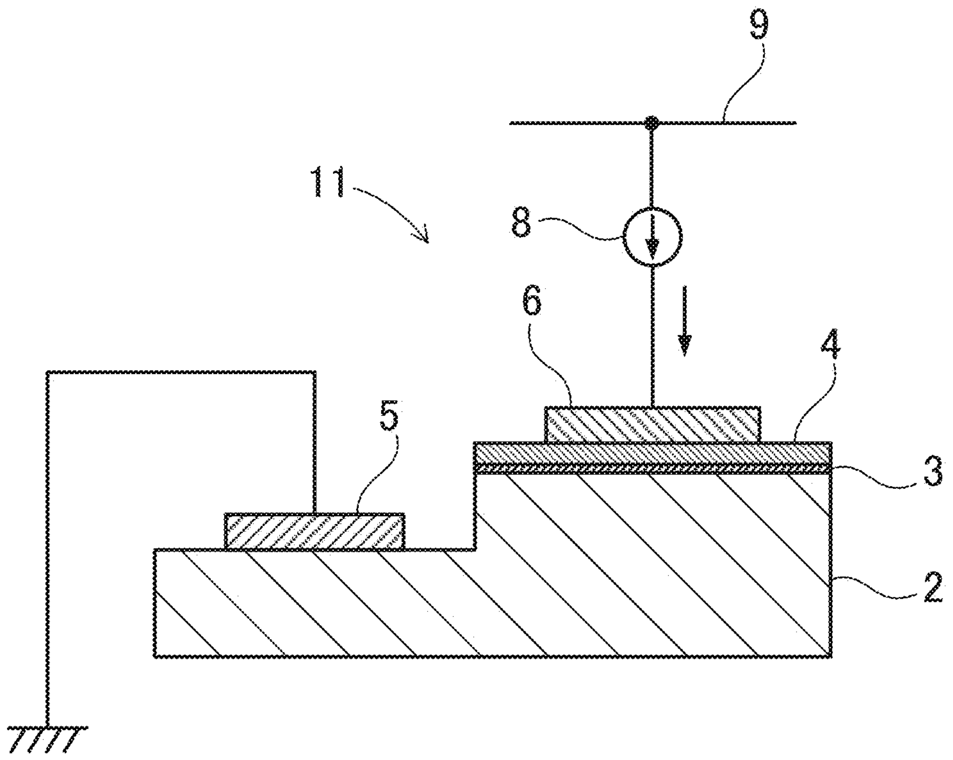
FIG. 10 is a schematic cross-sectional view illustrating an example of an element structure of a light-emitting element.

FIG. 10 illustrates an example of an element structure in the case of using an LED as the light-emitting element 11. The light-emitting element 11 illustrated in FIG. 5 includes an n-type semiconductor layer 2, an active layer 3, a p-type semiconductor layer 4, an n-side electrode 5, and a p-side electrode 6. The active layer 3 may have a multiple quantum well structure (MQW) or the like. The light-emitting element 11 is connected to a pixel drive circuit 8 such as a DC power supply, and emits light upon receiving a drive current supplied from the power supply line 9. The light emission period of the first light-emitting element 11A is controlled by a specific drive current. The light emission color of the first light-emitting element 11A is fixed to blue. The second light emission color of the second light-emitting element 11B is controlled by a drive current, and the light emission period of the second light-emitting element 11B is controlled by the drive current. The second light emission color is tunable to any color from green to red.

The first light-emitting element 11A has a constant chromaticity even when the luminance differs between the pixels 12. The luminance gradation is controlled by PWM. On the other hand, the second light-emitting element 11B has tunable luminance and chromaticity between the pixels 12. A current value supplied to the second light-emitting element 11B and the second light emission color, that is, the chromaticity, are controlled in the range of (G-R). Specifically, in each pixel 12, the second lighting controller 50B acquires the RGB chromaticity by referring to the information storage 70. The chromaticity of B, that is, the first light emission color emitted by the first light-emitting element 11A is uniquely determined. On the other hand, the second light emission color of the second light-emitting element 11B is to be determined. First, a light emission color at the time of (G-R) wavelength variation and a luminance ratio of B to (G-R) are determined from a chromaticity signal to be displayed so as to correspond to a color at the time of B emission. Subsequently, a light emission intensity corresponding to a luminance signal to be displayed is determined from the chromaticity of the light emission color and the luminance ratio.

Method for Driving Light-Emitting Device

An example of a method for driving the light-emitting device 100 is described below. The lighting controller 50 causes the first control circuit 51 to supply a drive current to each of the first light-emitting element 11A and the second light-emitting element 11B, and causes the second control circuit 52 to control a light emission period of each of the first light-emitting element 11A and the second light-emitting element 11B. The step of driving, by the lighting controller 50, the plurality of first light-emitting elements 11A and the plurality of second light-emitting elements 11B1, 11B2, 11B3, and 11B4 includes a step of determining the second light emission color and a luminance ratio of the first light-emitting element 11A and the second light-emitting element 11B from a chromaticity signal and a luminance signal to be displayed by the pixel 12 so as to correspond to the first light emission color, a step of determining a light emission intensity corresponding to a luminance signal to be displayed based on the chromaticity of the second light emission color and the luminance ratio, a step of supplying, by the first control circuit 51, a drive current having a value corresponding to a light emission color to the corresponding one of the first light-emitting element 11A and the second light-emitting element 11B by referring to the information storage 70, and a step of controlling, by the second control circuit 52, a light emission period of the drive current to be supplied to each of the first light-emitting element 11A and the second light-emitting element 11B in accordance with the determined light emission intensity.

The first control circuit 51 controls the drive current of each of the plurality of first light-emitting elements 11A to be constant. The second control circuit 52 controls the light emission intensity by PWM control. The drive current of the first light-emitting element 11A is set to a drive current value at which blue light emission is highly efficient. For example, it is a rated current value.

The first control circuit 51 controls a light emission color by a current value for driving each of the plurality of second light-emitting elements 11B1, 11B2, 11B3, and 11B4. The second control circuit 52 controls the light emission period of the current value of each of the plurality of second light-emitting elements 11B1, 11B2, 11B3, and 11B4 controlled by first control circuit 51, thereby controlling the luminance. Specifically, the second control circuit 52 determines the chromaticity of the second light emission color and the luminance ratio of the first light-emitting element 11A and the second light-emitting element 11B from the chromaticity signal and the luminance signal to be displayed by each pixel 12 so as to correspond to the first light emission color. Subsequently, the second control circuit 52 determines the light emission intensity corresponding to the luminance signal to be displayed by the second light-emitting element 11B, based on the chromaticity of the second light emission color and the luminance ratio. In response to this, the first control circuit 51 supplies drive current having a value corresponding to a light emission color of each of the first light-emitting element 11A and the second light-emitting element 11B to the first light-emitting element 11A and the second light-emitting element 11B by referring to the information storage 70. The second control circuit 52 controls the light emission period of each of the first light-emitting element 11A and the second light-emitting element 11B in accordance with the determined light emission intensity.

Method for Determining Drive Current Value and PWM Light Emission Period

Figure 11:
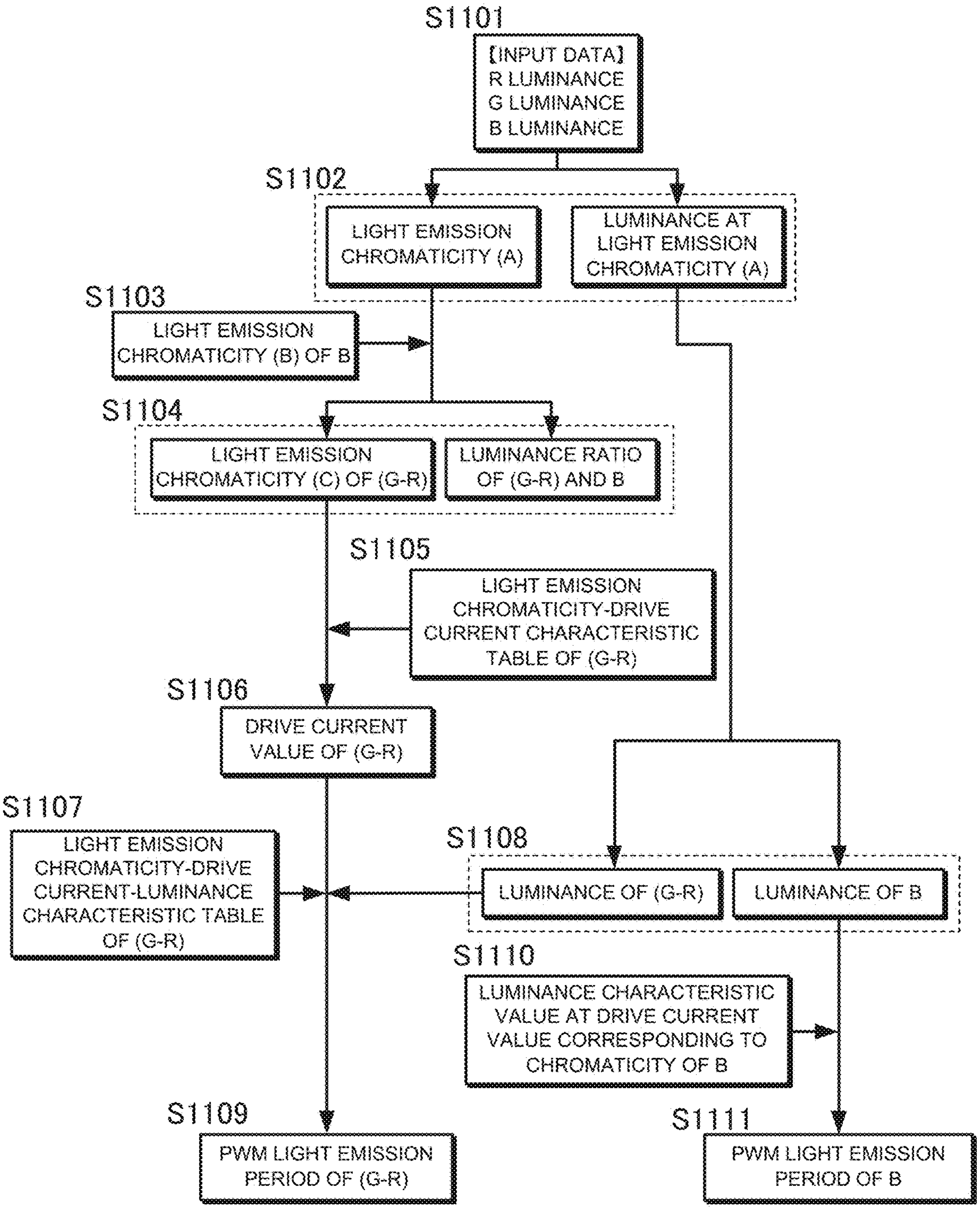
FIG. 11 is a functional block diagram illustrating a method for determining a drive current value and a PWM light emission period.
Figure 12A:
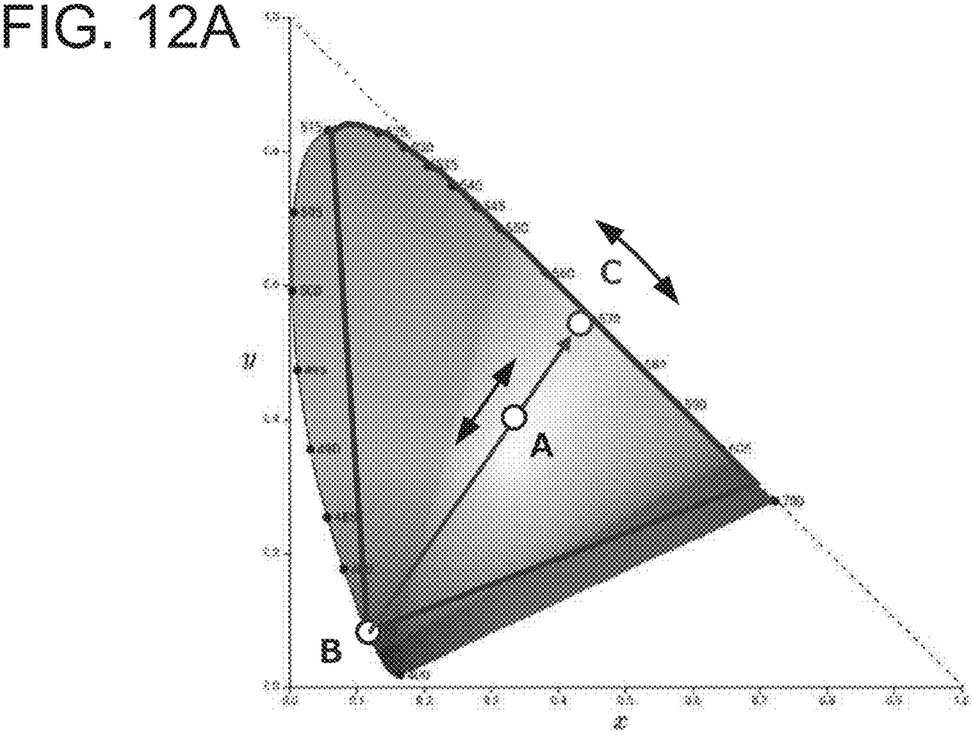
FIG. 12A is a chromaticity diagram for illustrating a procedure for determining a light emission chromaticity in FIG. 11

Details of the procedure for determining the drive current value and the PWM light emission period of each of the first light-emitting element 11A and the second light-emitting element 11B are described below with reference to the functional block diagram of FIG. 11 and the chromaticity diagram of FIG. 12A. First, in step S1101, the drive controller 60 acquires image data from an external source. The input data includes R luminance, G luminance, and B luminance.

Subsequently, in step S1102, a specific light emission chromaticity and luminance are determined for each pixel 12. A light emission chromaticity to be emitted is represented by a point A on the xy chromaticity diagram of FIG. 12A. In this chromaticity diagram, because the first light-emitting element 11A emits blue light as the first light emission color, it is fixed at a point B near the lower left apex of the chromaticity diagram. On the other hand, because the second light-emitting element 11B emits light of a second light emission color between green and red, the second light emission color is represented on the chromaticity diagram at a point C between green near the upper apex and red near the right apex of the chromaticity diagram. Accordingly, the chromaticity at the point A expressed by the mixed light of the first light-emitting element 11A and the second light-emitting element 11B can be expressed by the points B and C. In other words, the light emission color of the second light-emitting element 11B is adjusted to adjust the point C to express the chromaticity at the point A. Moreover, the luminance ratio of B to (G-R) is determined with respect to a predetermined point A in consideration of the balance of the luminance between the first light-emitting element 11A and the second light-emitting element 11B. Thus, the drive current value and the light emission period of the second light-emitting element 11B at the point C are determined.

In accordance with the above-described idea, by considering the light emission chromaticity (B) of B from the light emission chromaticity (A) of A determined in step S1102 (step S1103), the light emission chromaticity (C) of (G-R) and the luminance ratio of B to (G-R) are determined (step S1104). When the luminance ratio of B to (G-R) is determined in step S1104, the luminance of (G-R) and the luminance of B are inevitably obtained from the luminance at the light emission chromaticity (A) in step S1102 (step S1108).

On the other hand, when the light emission chromaticity (C) of (G-R) is determined in step S1104, the light emission chromaticity-drive current characteristic table of (G-R) stored in the information storage 70 is referenced (step S1105) to determine the drive current value of (G-R) (step S1106).

When the drive current value of (G-R) is determined in step S1106, the light emission chromaticity-drive current-luminance characteristic table of (G-R) (step S1107) stored in the information storage 70 and the luminance of (G-R) (step S1108) are referenced to determine the PWM light emission period of (G-R) (step S1109).

Figure 12B:
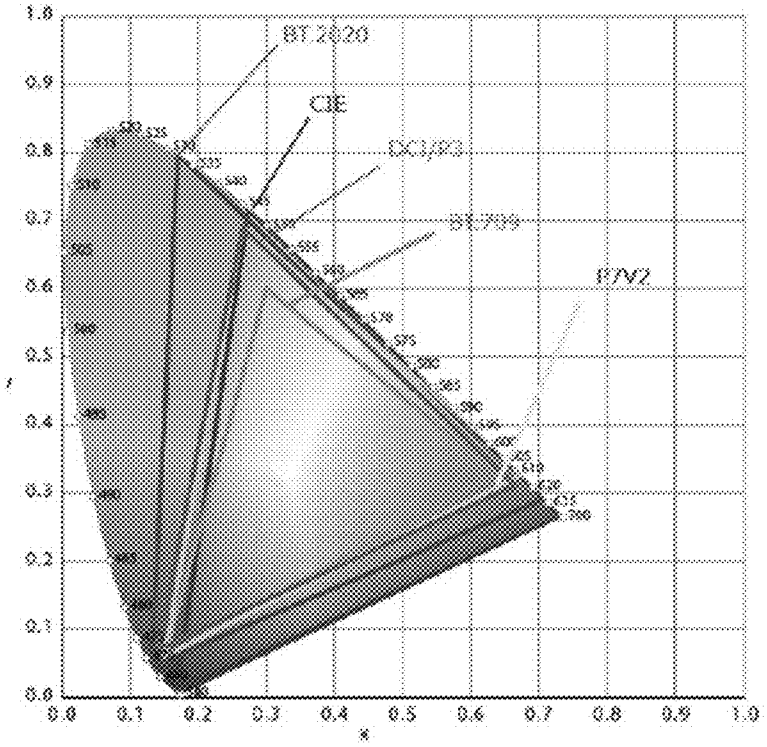
FIG. 12B RELATED ART
FIG. 12B is a chromaticity diagram illustrating a chromaticity range in the related art.

On the other hand, from the luminance of B obtained in step S1108, the PWM light emission period of B is determined with reference to the luminance characteristic value (step S1110) at the drive current value corresponding to the chromaticity of B (step S1111). In this way, the drive current values of the second light-emitting elements 11B and the PWM light emission periods of the first light-emitting elements 11A and the second light-emitting elements 11B are determined. The drive current value of the first light-emitting element 11A is a drive current value at which the light emission efficiency when the first light-emitting element 11A is caused to emit light is maximized. As for a displayable range of the point A in the present embodiment illustrated in FIG. 12A, a displayable chromaticity range of the point A in the present embodiment is expanded in comparison with a triangular chromaticity range that can be displayed by a known pixel using RGB three-color light emission illustrated in FIG. 12B, which is another advantage of the present embodiment. In addition, the point C can be brought closer to an outer edge on the chromaticity diagram by narrowing the full width at half maximum (FWHM) of the light emission wavelength of the light-emitting element. Such advantages are the same in other embodiments to be described below.

Second Embodiment

In the above-described first embodiment, an example has been described in which the unit sub-pixel group 13G is set to include five sub-pixels, and one first light-emitting element 11A shared by four second light-emitting elements 11B is arranged to form four pixels formed by the second light-emitting elements 11B. However, the present disclosure is not limited to this configuration, and the unit sub-pixel group may have four sub-pixels or less or six sub-pixels or more. As a light-emitting device 200 according to a second embodiment, an example in which a unit sub-pixel group 13G2 includes three sub-pixels and one first light-emitting element 11A is arranged for every two second light-emitting elements 11B is described with reference to FIGS. 13 and 14. In this example, the same members as those of the above-described first embodiment are denoted by the same reference numerals, and detailed description thereof is omitted. Also in the light-emitting device 200 according to the second embodiment, the first light emission color is fixed to blue, and the second light emission color is tunable between green and red according to a drive current.

Figure 13:
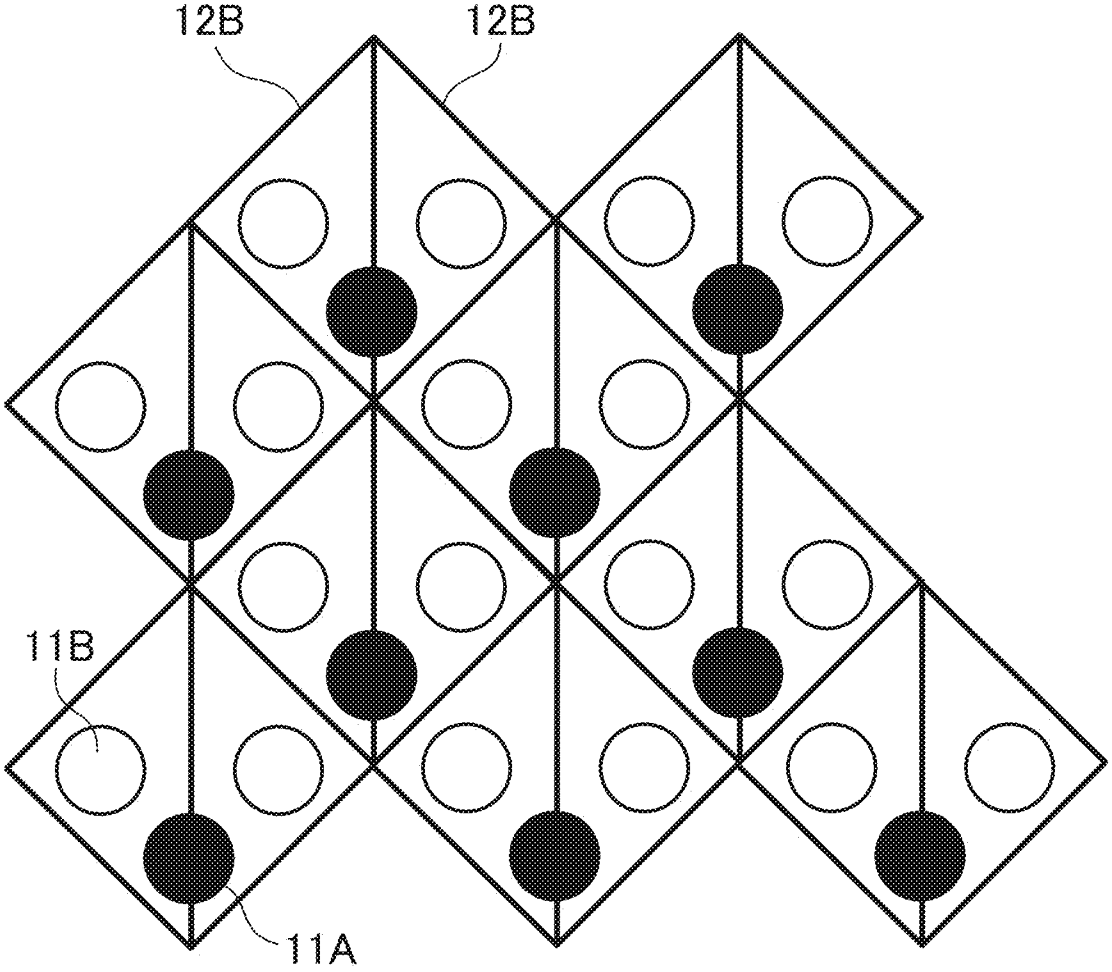
FIG. 13 is a schematic enlarged view illustrating a display of a light-emitting device according to a second embodiment.

In a display 10B illustrated in FIG. 13, the number of first light-emitting elements 11A constituting one pixel 12B is relatively increased as compared with FIG. 3 and the like. In the example of FIG. 3 and the like, the unit sub-pixel group 13G is set to include five sub-pixels, and one first light-emitting element 11A is arranged for every four second light-emitting elements 11B1, 11B2, 11B3, and 11B4. On the other hand, in FIG. 13, the unit sub-pixel group 13G2 includes three sub-pixels, and one first light-emitting element 11A is arranged for every two second light-emitting elements 11B1 and 11B2. That is, the light-emitting device 200 according to the second embodiment uses twice as many first light-emitting elements 11A as the light-emitting device 100 according to the first embodiment. As a result, light emission with higher definition than the light-emitting device 100 according to the first embodiment can be implemented.

In the light-emitting device 200 according to the second embodiment, one pixel 12B is defined as indicated by a region surrounded by a right-angled triangle in FIG. 13. That is, the second light-emitting elements 11B arranged in a matrix are defined to be included in the vicinity of a right angle in each pixel 12B having a pattern of repeating right-angled triangles arranged opposite each other with their hypotenuse vertical. In addition, half of the first light-emitting element 11A is defined to be present in the vicinity of an acute angle of the right-angled triangle in a manner that the first light-emitting element 11A straddles the hypotenuse. As a result, the area ratio of the first light-emitting element 11A occupying one pixel 12B is about ½ of that of the second light-emitting elements 11B.

One first light-emitting element 11A disposed on the hypotenuse of the right-angled triangle constituting one pixel 12B is shared by two adjacent pixels 12B in a region of about ½. In other words, each first light-emitting element 11A straddles two adjacent pixels 12B on the common hypotenuse of the two pixels 12B. However, the first light-emitting element 11A is not disposed in all regions surrounded by four adjacent second light-emitting elements 11B, and the first light-emitting element 11A is disposed in every other space surrounded by the four second light-emitting elements 11B.

Figure 14:
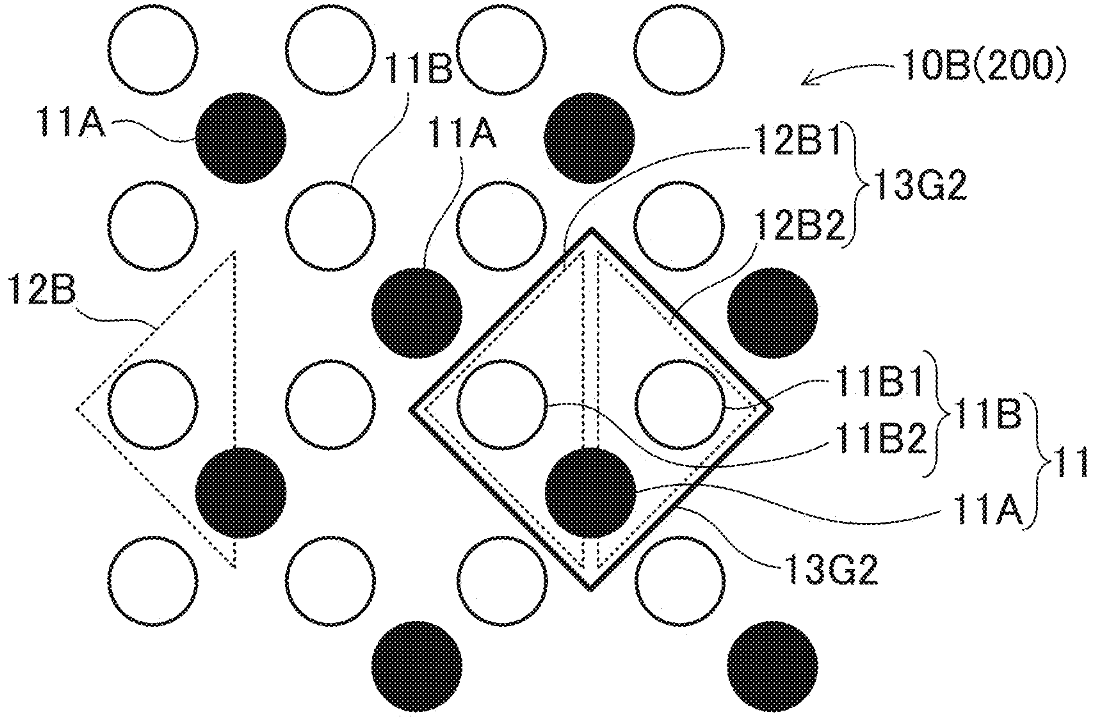
FIG. 14 is a schematic enlarged view illustrating a unit sub-pixel group in the display in FIG. 13.

To implement such an arrangement, in the example of FIG. 14, when the second light-emitting elements 11B arranged in a matrix are seen along an extension line of the display 10B in an oblique direction, the first light-emitting element 11A is arranged between two second light-emitting elements 11B adjacent to each other in the oblique direction. As a result, the second light-emitting element 11B and the first light-emitting element 11A are alternately arranged in the oblique direction. Such extension lines (referred to as alternate arrangement lines) in the oblique direction in which the second light-emitting element 11B and the first light-emitting element 11A are alternately arranged are provided in every other row in the oblique direction of the display 10B.

In FIG. 14, one unit sub-pixel group 13G2 is a diamond-shaped region surrounded by a solid line. That is, the unit sub-pixel group 13G2 is constituted by a total of three sub-pixels, that is, two second light-emitting elements 11B1 and 11B2 (that is, two sub-pixels) and one first light-emitting element 11A (that is, one sub-pixel), which are included in two pixels 12B1 and 12B2 adjacent to each other with their hypotenuses in common. These three sub-pixels determine the light emission color and luminance of the unit sub-pixel group 13G2. As a procedure for determining the light emission color and the light emission luminance of each sub-pixel constituting the unit sub-pixel group 13G2, the light emission color of the unit sub-pixel group 13G2 is first determined. When the light emission color of the unit sub-pixel group 13G2 is determined, the light emission colors of the two second light-emitting elements 11B1 and 11B2 constituting the unit sub-pixel group 13G2 are determined. That is, the light emission colors of the two second light-emitting elements 11B1 and 11B2 are the same. Subsequently, the light emission luminance of each pixel 12B is determined. To determine the light emission luminance of the pixel, the drive current value and the light emission period of each sub-pixel constituting the pixel are to be determined.

A procedure for determining the drive current value and the light emission period of each sub-pixel is described below with reference to the flowchart of FIG. 5. First, in step S501, the average chromaticity and average luminance of video data to be displayed are determined for each unit sub-pixel group 13G2. In the example of FIG. 14, with respect to a total of three light-emitting elements 11 including the first light-emitting element 11A and the two second light-emitting elements 11B1 and 11B2 adjacent to the first light-emitting element 11A, which constitute three sub-pixels being the unit sub-pixel group 13G2, the average chromaticity and the average luminance are calculated for each unit sub-pixel group 13G2. In this configuration, although the definition of chromaticity is reduced to ½, because the color resolution of the human eye is lower than the luminance resolution, deterioration of image quality is not perceived.

Subsequently, in step S502, the average chromaticity and luminance of the second light-emitting elements 11B1 and 11B2 and the chromaticity and luminance of the first light-emitting element 11A in the unit sub-pixel group 13G2 are determined using a predetermined algorithm. The average luminance of the two second light-emitting elements 11B1 and 11B2 is determined by the light emission period of the second light-emitting element 11B. The chromaticity of the first light-emitting element 11A is determined by a drive current value, and the luminance thereof is determined by a light emission period. The second light-emitting elements 11B1 and 11B2 in the unit sub-pixel group 13G2 emit light with the same chromaticity at the same drive current value. In the example of FIG. 14, the second light-emitting elements 11B1 and 11B2 being the two sub-pixels emit light of the same color. The predetermined algorithm for determining the average chromaticity and luminance of the second light-emitting element 11B and the chromaticity and luminance of the first light-emitting element 11A is as described with reference to FIG. 11.

Finally, in step S503, the luminance of each sub-pixel belonging to the unit sub-pixel group 13G2 is determined. That is, the sub-luminance of the second light-emitting element 11B is allocated in accordance with the luminance of each sub-pixel belonging to the unit sub-pixel group 13G2, and thus the luminance of each sub-pixel is determined. The luminance of the second light-emitting element 11B is determined by the light emission period. The light emission period of the second light-emitting element 11B is allocated in accordance with the ratio of the luminance signals of the three sub-pixels constituting the unit sub-pixel group 13G2, and thus the light emission period of each pixel 12B is determined. After the chromaticity is determined for each unit sub-pixel group 13G2 in this way, the luminance of each pixel 12B can be determined.

Third Embodiment

As a light-emitting device 300 according to a third embodiment, an example in which a unit sub-pixel group 13G3 includes two sub-pixels and one first light-emitting element 11A is arranged for each second light-emitting element 11B is described with reference to FIG. 15. In this example, the same members as those of the above-described first embodiment and the like are denoted by the same reference numerals, and detailed description thereof is omitted. Also in the light-emitting device 300 according to the third embodiment, the first light emission color is fixed to blue, and the second light emission color is tunable between green and red in accordance with a drive current.

Figure 15:
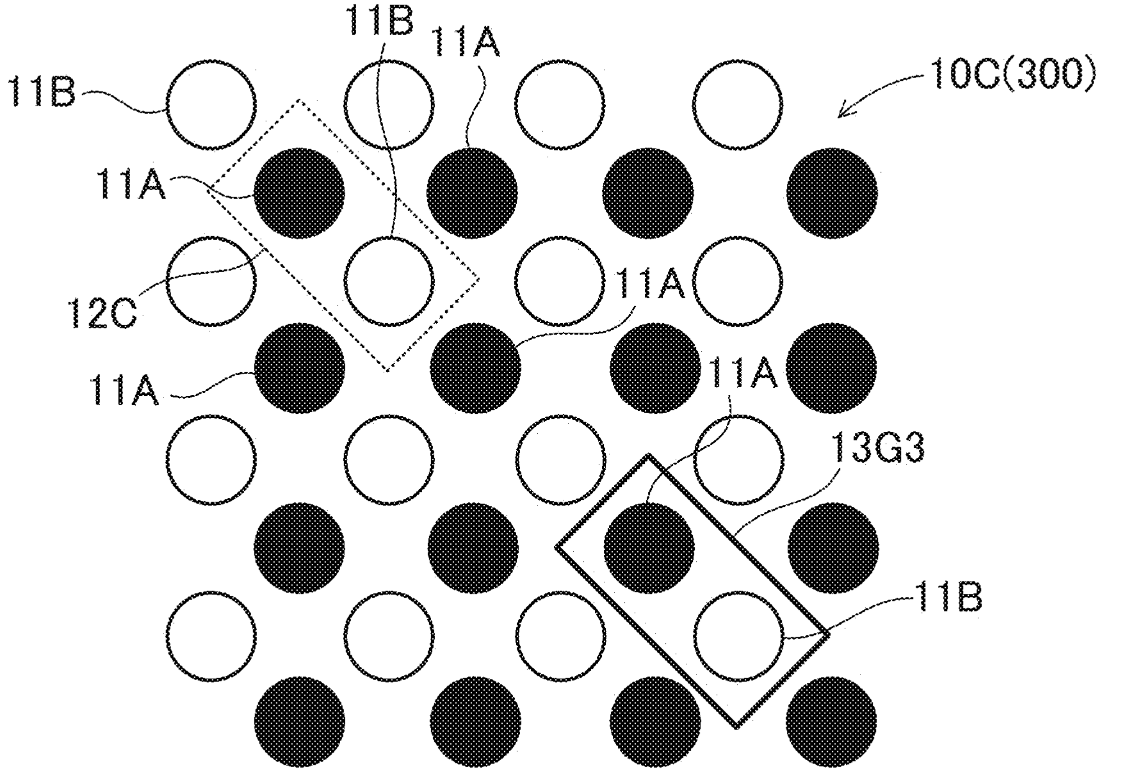
FIG. 15 is a schematic enlarged plan view illustrating a display of a light-emitting device according to a third embodiment.

In a display 10C illustrated in FIG. 15, the number of first light-emitting elements 11A constituting one pixel 12C is relatively further increased as compared with FIG. 3 and the like. While the unit sub-pixel group 13G is set to include five sub-pixels in the example of FIG. 3 and three sub-pixels in FIG. 14, the unit sub-pixel group 13G3 is set to include two sub-pixels in FIG. 15, with one first light-emitting element 11A is arranged for each second light-emitting element 11B. That is, the light-emitting device 300 according to the third embodiment uses four times as many first light-emitting elements 11A as the light-emitting device 100 according to the first embodiment. Thus, a decrease in the definition of chromaticity does not occur, so that a light emission display with higher definition than the light-emitting device 100 according to the first embodiment can be implemented. On the other hand, the number of sub-pixels is larger than that of the light-emitting device 100 according to the first embodiment.

In the light-emitting device 300 according to the third embodiment, one pixel 12C is defined as indicated by a region surrounded by a broken line in FIG. 15. That is, each second light-emitting element 11B and an adjacent first light-emitting element 11A constitute one pixel 12C. As a result, the number of first light-emitting elements 11A occupying one pixel 12C is one, which is twice as large as that of the second embodiment.

In the example of FIG. 15, unlike FIGS. 3 and 14, the first light-emitting element 11A is disposed in all the regions surrounded by four adjacent second light-emitting elements 11B. In other words, in all of alternate arrangement lines, the first light-emitting element 11A is arranged between two second light-emitting elements 11B adjacent to each other in the oblique direction. In addition, FIG. 15 illustrates an example in which one pixel 12C is constituted by, among four second light-emitting elements 11B adjacent to the periphery of each first light-emitting element 11A, the first light-emitting element 11A and a second light-emitting element 11B positioned at a lower right of the first light-emitting element 11A. However, this is merely an example, and one pixel 12C may be constituted by the first light-emitting element 11A and other second light-emitting elements 11B adjacent to the periphery of the first light-emitting element 11A, for example, second light-emitting element 11B in upper right, upper left, or lower left.

In FIG. 15, one unit sub-pixel group 13G3 is a region surrounded by a solid line. Here, one unit sub-pixel group 13G3 is constituted by a total of two sub-pixels, that is, one second light-emitting element 11B (that is, one sub-pixel) and one adjacent first light-emitting element 11A (that is, one sub-pixel). That is, in the third embodiment, one pixel 12C and the unit sub-pixel group 13G3 coincide with each other. These two sub-pixels determine the light emission color and the luminance of the unit sub-pixel group 13G3. As a procedure for determining the light emission color and the light emission luminance of each sub-pixel constituting the unit sub-pixel group 13G3, the light emission color of the unit sub-pixel group 13G3 is first determined. When the light emission color of the unit sub-pixel group 13G3 is determined, the light emission colors of the first light-emitting element 11A and the second light-emitting element 11B constituting the unit sub-pixel group 13G3 are determined. Subsequently, the light emission luminance of each sub-pixel is determined.

Figure 16:
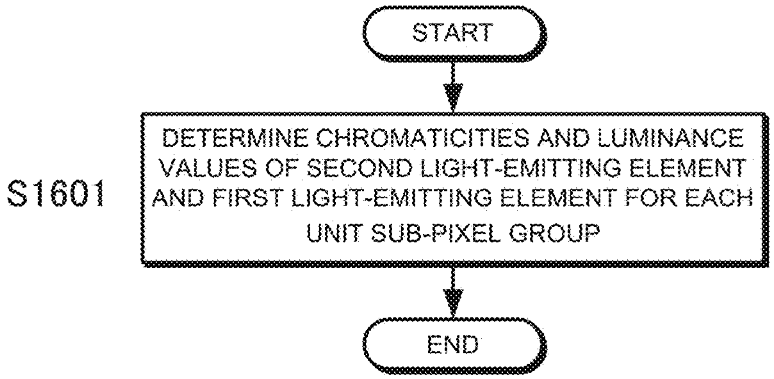
FIG. 16 is a flowchart illustrating a procedure for determining a drive current value and a light emission period of each sub-pixel in FIG. 15.

A procedure for determining the drive current value and the light emission period of each sub-pixel is described below with reference to the flowchart of FIG. 16. Because the unit sub-pixel group 13G3 includes one second light-emitting element 11B, no average chromaticity and luminance need not to be calculated. Accordingly, in step S1601, for each unit sub-pixel group 13G3, the chromaticity and the luminance of each of the second light-emitting element 11B and the first light-emitting element 11A in the unit sub-pixel group 13G3 are determined using a predetermined algorithm. The chromaticity of the second light-emitting element 11B is determined by a drive current value, and the luminance thereof is determined by a light emission period of the second light-emitting element 11B. The chromaticity of the first light-emitting element 11A is determined by a drive current value, and the luminance thereof is determined by a light emission period. The predetermined algorithm for determining the average chromaticity and luminance of the second light-emitting element 11B and the chromaticity and luminance of the first light-emitting element 11A is as described with reference to FIG. 11. After the chromaticity of each unit sub-pixel group 13G3 is determined in this way, the luminance of each pixel 12C can be determined.

Fourth Embodiment

Figure 17:
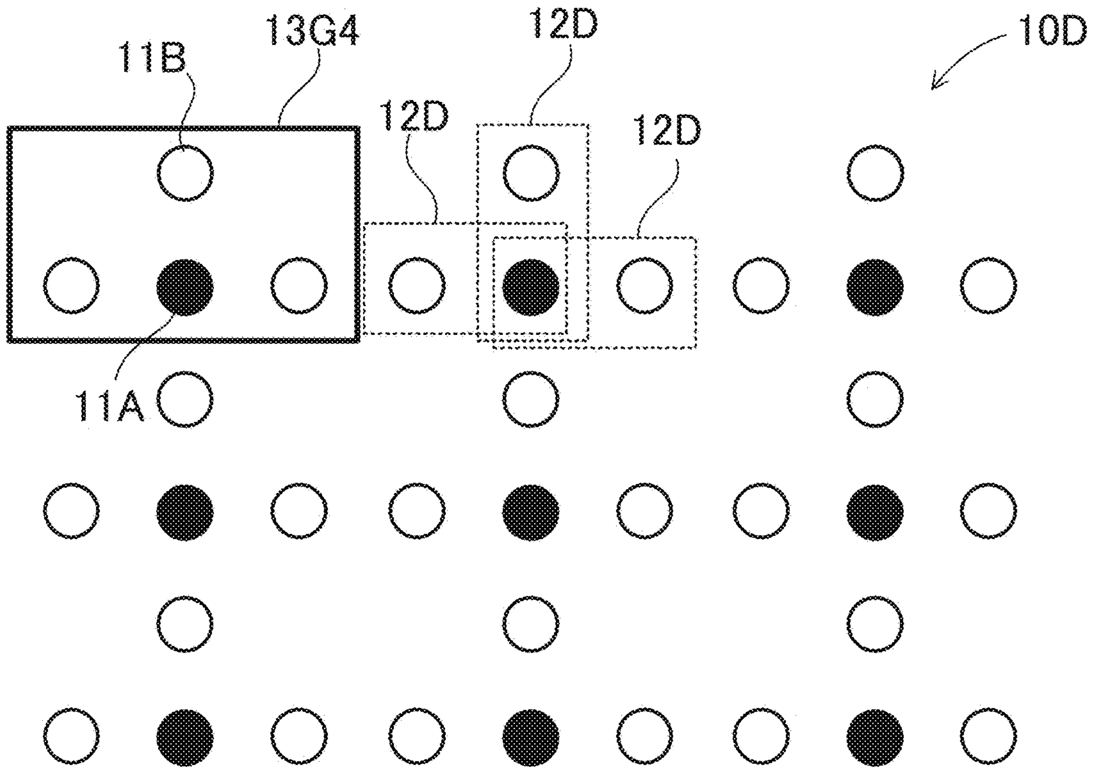
FIG. 17 is a schematic enlarged view illustrating a display of a light-emitting device according to a fourth embodiment.

In each of the above-described embodiments, an example in which the first light-emitting element 11A is arranged to be offset between the second light-emitting elements 11B arranged in a matrix has been described. For example, the first light-emitting element 11A is arranged in all the regions surrounded by four adjacent second light-emitting elements 11B in FIG. 15, the first light-emitting element 11A is arranged every other second light-emitting element 11B in the example of FIG. 14, and the first light-emitting element 11A is arranged every four second light-emitting elements 11B in the example of FIG. 3. In any of the examples, because the first light-emitting element 11A is disposed between the second light-emitting elements 11B disposed at equal intervals in a matrix, the distance between the first light-emitting element 11A and the second light-emitting element 11B is shorter than the distance between the second light-emitting elements 11B. However, the present disclosure is not limited to such an arrangement example, and the first light-emitting element may be arranged at equal intervals to the second light-emitting element. Such an example is illustrated in FIG. 17 as a fourth embodiment. In this drawing, the same members as those of the above-described first embodiment and the like are denoted by the same reference numerals, and detailed description thereof is omitted. Also in a light-emitting device 400 according to the fourth embodiment, the first light emission color is fixed to blue, and the second light emission color is tunable between green and red in accordance with a drive current.

In a display 10D illustrated in FIG. 17, a unit sub-pixel group 13G4 is constituted by a total of four sub-pixels, that is, one first light-emitting element 11A (that is, one sub-pixel) and three second light-emitting elements 11B (that is, three sub-pixels) as indicated by a solid-line frame in the drawing. In this configuration, one pixel 12D is computationally constituted by one second light-emitting element 11B and about ⅓ of the first light-emitting elements 11A. In FIG. 17, one pixel 12D is indicated by a broken line. In this example, three pixels share the first light-emitting element 11A and are arranged in a form in which rectangles extending in three directions of right, upper, and left partially overlap one another. In addition, the second light-emitting elements 11B and the first light-emitting elements 11A are arranged such that a row in which the second light-emitting elements 11B and the first light-emitting elements 11A are mixed at equal intervals at a first distance and a row constituted by only the second light-emitting elements 11B are arranged in every other row in the lateral direction. In the row in which the second light-emitting elements 11B and the first light-emitting elements 11A are mixed, the second light-emitting elements 11B and the first light-emitting elements 11A are repeatedly arranged at equal intervals, with every two second light-emitting elements 11B and one first light-emitting element 11A. In addition, in the row constituted by only the second light-emitting elements 11B, the second light-emitting elements 11B are separated from upper and lower first light-emitting elements 11A by the first distance in correspondence with the position where the first light-emitting elements 11A are disposed in the row including the second light-emitting elements 11B and the first light-emitting elements 11A adjacent to each other in the vertical direction. As a result, in the row constituted by only the second light-emitting elements 11B, the second light-emitting elements 11B are arranged every two spaces as compared with upper and lower rows.

Also in FIG. 17, the light emission color and the luminance of the unit sub-pixel group 13G4 are determined by four sub-pixels constituting one unit sub-pixel group 13G4. That is, the light emission color of the unit sub-pixel group 13G4 is first determined, and then the light emission colors of the first light-emitting element 11A and the second light-emitting elements 11B constituting the unit sub-pixel group 13G4 are determined. Moreover, the light emission luminance of each sub-pixel is determined. A specific procedure for determining the drive current value and the light emission period of each sub-pixel is the same as that in the flowchart of FIG. 5.

Fifth Embodiment

In the light-emitting device according to each of the embodiments described above, an example has been described in which the first light emission color is blue and the second light emission color is tunable between green and red. However, the present disclosure is not limited to this configuration, and other light emission colors can also be assigned to the first light emission color and the second light emission color. As an example, in a light-emitting device 500 according to a fifth embodiment, the first light emission color is fixed to red, and the second light emission color is tunable between green and blue in accordance with a drive current. With such a configuration, one pixel can be constituted by two types of first light-emitting elements 11A that can emit red light and second light-emitting elements 11B that can emit blue to green light without arranging three types of sub-pixels of RGB in each pixel 12E, so that a light-emitting device can be constituted by a small number of light-emitting elements. In addition, in the second light-emitting element 11B being a wavelength-tunable light-emitting element, even though the second light-emitting element 11B is not controlled to the entire chromaticity range of RGB, the second light-emitting element 11B can be controlled only to the chromaticity range from blue to green. Therefore, there is obtained an advantage that the yield at the time of manufacturing is improved and the control at the time of lighting is simplified.

As the first light-emitting element 11A, a quaternary semiconductor light-emitting element such as AlInGaP can be used. This can improve the light emission efficiency of the first light-emitting element 11A that emits red light. In addition, there is obtained an advantage that a widely used red light-emitting diode can be stably used at a low cost.

Figure 18:
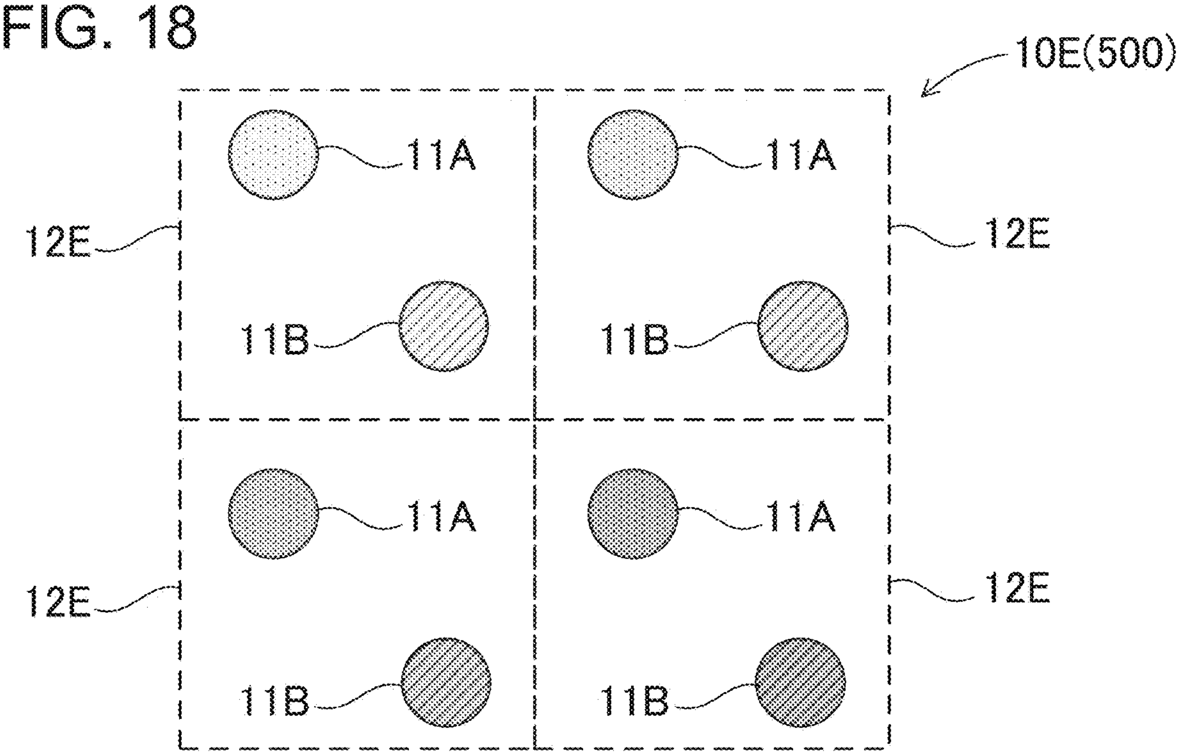
FIG. 18 is a schematic enlarged plan view illustrating a display of a light-emitting device according to a fifth embodiment.

A display 10E of the light-emitting device 500 according to the fifth embodiment is illustrated in FIG. 18. In this example, the same members as those of the above-described first embodiment and the like are denoted by the same reference numerals, and detailed description thereof is omitted. As illustrated in this drawing, in the display 10E, the first light-emitting element 11A and the second light-emitting element 11B are arranged for each pixel 12E. FIG. 18 illustrates an example in which one pixel 12E is constituted by two sub-pixels by arranging one first light-emitting element 11A and one second light-emitting element 11B in each pixel 12E. The first light-emitting element 11A is a red light-emitting element, and the second light-emitting element 11B is a tunable light-emitting element whose light emission wavelength is tunable from blue light to green light by a drive current. The light emission wavelength of the red light is, for example, 630 nm. The light emission wavelengths of blue light to green light are variable in a range from 470 nm to 530 nm, for example.

Figure 19:
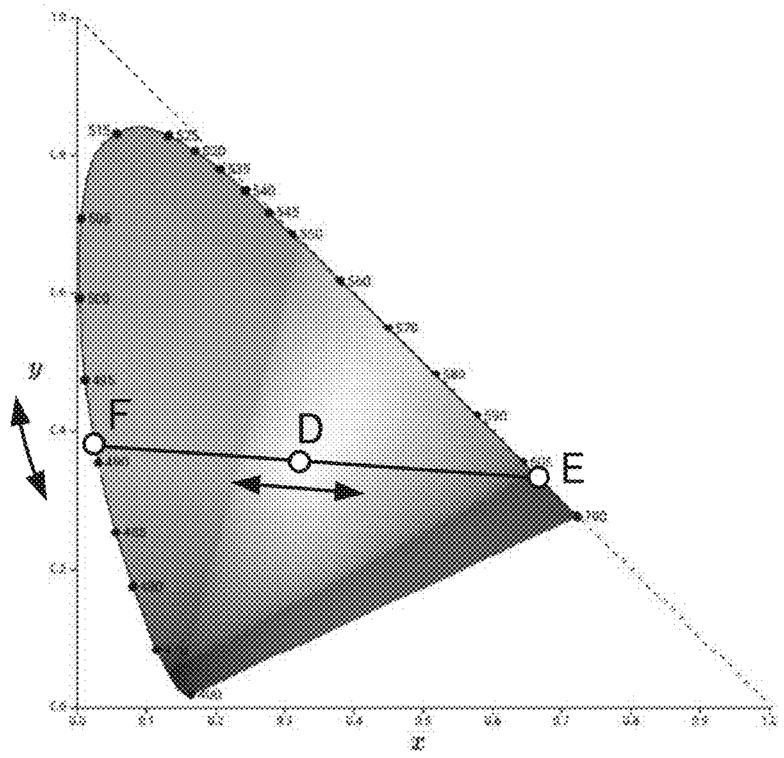
FIG. 19 is a chromaticity diagram for illustrating a procedure for determining a light emission chromaticity in the light-emitting device in FIG. 18.

A light emission chromaticities to be emitted by the first light-emitting element 11A being the red light-emitting element and the second light-emitting element 11B being the tunable light-emitting element that emits blue light to green light are represented by a point D on the chromaticity diagram of FIG. 19. In this chromaticity diagram, because the first light-emitting element 11A emits red light as the first light emission color, it is fixed at a point E near the lower right apex of the chromaticity diagram. On the other hand, because the second light-emitting element 11B emits light of the second light emission color between blue and green, the second light emission color is represented on the chromaticity diagram at a point F between green near the upper apex and blue near the left apex of the chromaticity diagram. Accordingly, the chromaticity at the point D expressed by the mixed light of the first light-emitting element 11A and the second light-emitting element 11B can be expressed by the points E and F. In other words, the light emission color of the second light-emitting element 11B is adjusted to adjust the point F to express the chromaticity at the point D. Moreover, the luminance ratio of R to (B-G) is determined with respect to a predetermined point D in consideration of the balance of the luminance between the first light-emitting element 11A and the second light-emitting element 11B. Thus, the drive current value and the light emission period of the second light-emitting element 11B at the point F are determined. In this way, a sufficiently wide chromaticity range can be implemented without emission of monochromatic light in the range from green light to red light. This also enables display of cyan with high color purity, which has been difficult to express in the related art.

Figure 20:
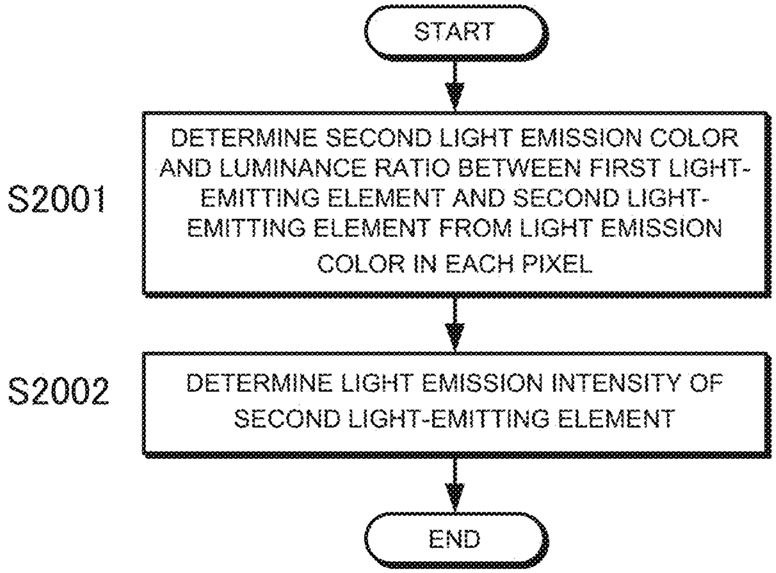
FIG. 20 is a flowchart illustrating a procedure for determining a drive current value and a light emission period of each sub-pixel in FIG. 18.

A procedure for determining the drive current value and the light emission period of each sub-pixel is described with reference to the flowchart of FIG. 20. First, in step S2001, in each pixel 12E, the second light emission color to drive the second light-emitting element 11B to emit light and the luminance ratio between the first light-emitting element 11A and the second light-emitting element 11B are calculated based on a light emission color to be displayed in the pixel 12E. Here, the light emission color from blue to green of the second light-emitting element 11B (F on the chromaticity diagram of FIG. 19) and the luminance ratio of R to B-G (corresponding to D on the chromaticity diagram of FIG. 19) are determined from a chromaticity signal of video data so as to correspond to the red light R of the first light-emitting element 11A.

Subsequently, in step S2002, the light emission intensity of the second light-emitting element 11B is calculated. Here, a light emission intensity corresponding to a luminance signal to be displayed by the second light-emitting element 11B is determined based on red light being the first light emission color of the first light-emitting element 11A and the chromaticity of the light emission color (F) from blue to green of the second light-emitting element 11B obtained in step S2001 and the luminance ratio (D) obtained in step S2001. In this way, the chromaticity and luminance of each sub-pixel can be determined.

FIG. 18 illustrates an example in which one first light-emitting element 11A and one second light-emitting element 11B are disposed in each pixel 12E; however, the present disclosure is not limited to this configuration and two or more first light-emitting elements or two or more second light-emitting elements may be disposed in one pixel. This makes it possible to improve the luminance per pixel.

Figure 21A:
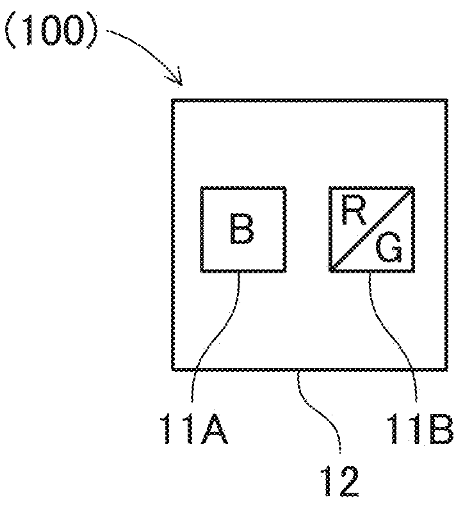
FIG. 21A is a schematic diagram illustrating one pixel of the light-emitting device according to the first embodiment and FIG. 21B is a schematic diagram illustrating one pixel of a light-emitting device according to a sixth embodiment.

In the light-emitting device 100 according to the first embodiment described above, the first light-emitting element 11A and the second light-emitting element 11B are provided for each pixel 12. As illustrated in FIG. 21A, the first light-emitting element 11A is a fixed-wavelength light-emitting element for blue light, and the second light-emitting element 11B is a tunable-wavelength light-emitting element for green to red light. In this example, one first light-emitting element 11A and one second light-emitting element 11B are provided in each pixel 12; however, a plurality of first light-emitting elements and/or a plurality of second light-emitting elements may be provided in each pixel. This makes it possible to increase the light emission luminance.

Sixth Embodiment

Figure 21B:
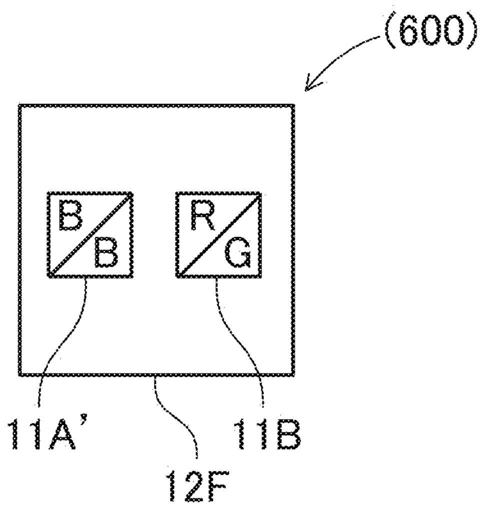

The present disclosure is not limited to the configuration in which the first light-emitting element has a fixed wavelength and the second light-emitting element has a tunable wavelength, and the first light-emitting element may also be a tunable-wavelength light-emitting element. Such an example is illustrated in FIG. 21B as a light-emitting device 600 according to a sixth embodiment. FIGS. 21A and 21B illustrate examples in which a fixed-wavelength light-emitting element is indicated by a square and tunable-wavelength light-emitting elements are each indicated by a square with a diagonal line. The tunable-wavelength light-emitting element is driven by tuning a light emission wavelength in a range from a light emission color in an upper left region to a light emission color in a lower right region of the square separated by a diagonal line. The reason why the square is separated by a diagonal line is merely to indicate a change in a light emission wavelength, and it is not intended that a light-emitting region of the light-emitting element is physically divided by a diagonal line to emit light in different light emission colors for each region.

In the light-emitting device 100 according to the first embodiment illustrated in FIG. 21A, the first light-emitting element 11A is a fixed-wavelength light-emitting element, and the second light-emitting element 11B is a tunable-wavelength light-emitting element, which is used by varying a light emission wavelength in the range of light emission colors from red R to green G. On the other hand, in the sixth embodiment illustrated in FIG. 21B, a tunable-wavelength light-emitting element is also used as a first light-emitting element 11A', but the light-emitting element 11A' is driven with its light emission wavelength fixed to blue B.

Regardless of the light emission wavelength range actually driven in this way, the tunable range of light emission wavelength of the tunable-wavelength light-emitting element used as the first light-emitting element 11A' may be B-G, B-R, or B-Y as long as B being the first light emission color is included in the tunable range of light emission wavelength. In this case, when the tunable-wavelength light-emitting element used as the first light-emitting element 11A' and the tunable-wavelength light-emitting element used as the second light-emitting element 11B are light-emitting elements with both B-R tunable emission wavelength ranges regardless of the light emission wavelength range actually driven, each pixel 12F can be formed using single-specification light-emitting elements, so that the manufacturing process of the pixel 12F can be simplified. Similarly, as in the fourth embodiment, when the first light emission color is red R, the tunable range of the light emission wavelength of the tunable-wavelength light-emitting element used as the first light-emitting element 11A' is a range including R.

In addition, to cause the tunable-wavelength first light-emitting element 11A' to emit light with the first light emission color that is fixed to blue, the information storage 70 stores current-chromaticity information and the like of the first light-emitting element 11A' as well as the second light-emitting element 11B. The lighting controller 50 determines a drive current of the first light-emitting element 11A' corresponding to the first light emission color by referring to the information storage 70. Moreover, when the first light-emitting element 11A' is of a tunable-wavelength type, the wavelengths of blue light can be adjusted. For example, variations in the light emission wavelength of the first light-emitting element 11A' can be corrected among the pixels 12F and the wavelengths of blue light of the pixels 12F can be equalized.

The above examples describe an active matrix driving method, but the present disclosure can also be applied to a passive matrix driving method.

A light-emitting device and a method for driving the light-emitting device of the present disclosure can be suitably used for a medium-sized or a large-sized display, an indicator, signage, or the like, for example.

REFERENCE CHARACTERS LIST

100, 200, 300, 400, 500 Light-emitting device
2 n-type semiconductor layer
3 Active layer
4 p-type semiconductor layer
5 n-side electrode
6 p-side electrode
8 Pixel drive circuit
9 Power supply line
10, 10B, 10C, 10D, 10E Display
11 Light-emitting element; 11A, 11A' First light-emitting element
11B, 11B1, 11B2, 11B3, 11B4 Second light-emitting element
12, 12*a*, 12*b*, 12*c*, 12*d*, 12B, 12B1, 12B2, 12C, 12D 12E 12F Pixel
13G, 13G2, 13G3 Unit sub-pixel group
13A First sub-pixel
13B, 13B1, 13B2, 13B3, 13B4 Second sub-pixel
14 Pixel circuit; 14A First sub-pixel circuit;
14B, 14B1, 14B2, 14B3, 14B4 Second sub-pixel circuit
20 Scanning circuitry
30 Driver
50, 50A, 50B, 50B1, 50B2, 50B3, 50B4 Lighting controller
51, 51A, 51B, 51B1, 51B2, 51B3, 51B4 First control circuit
52, 52A, 52B, 52B1, 52B2, 52B3, 52B4 Second control circuit
60 Drive controller
70 Information storage
WS Write scanning line
WS2 Power supply control signal write scanning line; WS2 Analog image signal write scanning line
SL Signal line; SL1 Power supply control signal line; SL2 Analog image signal line

What is claimed is:

1. A light-emitting device comprising:

a display comprising a plurality of pixels in which a plurality of first light-emitting elements each configured to emit light of a first light emission color and a plurality of second light-emitting elements each configured to emit light of a second light emission color different from the first light emission color are arranged in a predetermined pattern; and a lighting controller configured to supply a drive current to each of the plurality of first light-emitting elements and the plurality of second light-emitting elements and control a light emission period of each of the plurality of first light-emitting elements and the plurality of second light-emitting elements, wherein:

the plurality of pixels include a first pixel comprising at least part of a first light-emitting element of the plurality of first light-emitting elements, and a distinct second light-emitting element of the plurality of second light emitting elements, the light emission color of the distinct second light-emitting element being tunable between green and red in accordance with a drive current of the second light-emitting element.

2. The light-emitting device according to claim 1, further comprising:

an information storage configured to store current-chromaticity information for determining a drive current value to drive each of the plurality of first light-emitting elements and the plurality of second light-emitting elements to emit light in accordance with a specific light emission color of each of the plurality of pixels, wherein the lighting controller is configured to control the plurality of first light-emitting elements and the plurality of second light-emitting elements based on the current-chromaticity information stored in the information storage so that each of the plurality of first light-emitting elements and the plurality of second light-emitting elements emits light of a specific light emission color and light emission luminance.

3. The light-emitting device according to claim 2, wherein:

the lighting controller comprises:

at least one first control circuit configured to supply a drive current to the plurality of first light-emitting elements and the plurality of second light-emitting elements, and at least one second control circuit configured to control a light emission period of the plurality of first light-emitting elements and the plurality of second light-emitting elements.

4. The light-emitting device according to claim 1, wherein:

the lighting controller comprises:

a plurality of first control circuits configured to supply a drive current to the plurality of first light-emitting elements and the plurality of second light-emitting elements, and a plurality of second control circuits configured to control a light emission period of the plurality of first light-emitting elements and the plurality of second light-emitting elements, and at least one of the plurality of the first control circuits and at least one of the plurality of the second control circuits are provided for each of the plurality of pixels.

5. The light-emitting device according to claim 3, wherein the first pixel is configured to emit light with the light of the first light emission color emitted by at least two of the plurality of first light-emitting elements and the light of the second light emission color emitted by at least two of the plurality of second light-emitting elements.

6. The light-emitting device according to claim 1, wherein the first light emission color is blue.

7. The light-emitting device according to claim 6, wherein the first light emission color has a fixed wavelength emission.

8. The light-emitting device according to claim 1, wherein:

in the display, each pixel comprises at least one distinct one of the plurality of second light-emitting elements, and each of the plurality of first light-emitting elements straddles adjacent pixels.

9. The light-emitting device according to claim 8, wherein, in the display, a sub-pixel group, in which the first light-emitting element and the second light-emitting element constituting each pixel are arranged adjacent to each other in a predetermined pattern, is periodically arranged.

10. The light-emitting device according to claim 8, wherein, in the display, each second light-emitting element is arranged inside a quadrangular shape that defines each respective pixel, and each first light-emitting element is arranged in a corner of the quadrangular shape that defines each respective pixel.

11. The light-emitting device according to claim 3, wherein:

the lighting controller is configured to:

determine a chromaticity of the second light emission color and a luminance ratio of the plurality of first light-emitting elements and the plurality of second light-emitting elements from a chromaticity signal and a luminance signal to be displayed by each pixel so as to correspond to the first light emission color, and determine a light emission intensity corresponding to a luminance signal to be displayed by the plurality of second light-emitting elements based on the chromaticity of the second light emission color and the luminance ratio, the first control circuit is configured to supply a drive current having a value corresponding to a light emission color of each of the plurality of first light-emitting elements and the plurality of second light emitting elements to the corresponding one of the plurality of first light-emitting elements and the plurality of second light-emitting elements by referring to the information storage, and the second control circuit is configured to control a light emission period of the drive current supplied by the first control circuit in accordance with the determined light emission intensity.

12. The light-emitting device according to claim 1, wherein:

the lighting controller is configured to set a time width for supplying a current to each of the plurality of first light-emitting elements and the plurality of second light-emitting elements based on comparison between a first signal comprising a triangular wave signal and a first DC voltage set in a predetermined period, and the lighting controller is configured to control a current value to be supplied based on a second DC voltage set in a period different from the predetermined period.

13. A method for driving a light-emitting device comprising a display, the method comprising:

providing the display, which comprises a plurality of pixels in which a plurality of first light-emitting elements each configured to emit light of a first light emission color and a plurality of second light-emitting elements each configured to emit light of a second light emission color different from the first light emission color are arranged in a predetermined pattern, wherein each of the plurality of pixels comprises at least one first light-emitting element of the plurality of first light-emitting elements, and at least one second light-emitting element of the plurality of second light-emitting elements, the light emission color of the plurality of second light-emitting elements being variable in accordance with a drive current of the second light-emitting elements;

providing a lighting controller configured to supply a drive current to each of the plurality of first light-emitting elements and the plurality of second light-emitting elements and control a light emission period of each of the plurality of first light-emitting elements and the plurality of second light-emitting elements;

providing an information storage configured to store current-chromaticity information for determining a drive current value to drive each of the plurality of first light-emitting elements and the plurality of second light-emitting elements to emit light in accordance with a specific light emission color of each of the plurality of pixels; and lighting, by the lighting controller, the plurality of first light-emitting elements and the plurality of second light-emitting elements by supplying a drive current to each of the plurality of first light-emitting elements and the plurality of second light-emitting elements and controlling a light emission period of each of the plurality of first light-emitting elements and the plurality of second light-emitting elements, wherein:

the step of lighting, by the lighting controller, the plurality of first light-emitting elements and the plurality of second light-emitting elements comprises:

determining a chromaticity of the second light emission color and a luminance ratio of the at least one first light-emitting element and the at least one second light-emitting element from a chromaticity signal and a luminance signal to be displayed by each of the plurality of pixels so as to correspond to the first light emission color, determining a light emission intensity corresponding to a luminance signal to be displayed based on the chromaticity of the second light emission color and the luminance ratio, supplying, by a first control circuit of the lighting controller, a drive current having a value corresponding to a light emission color of each of the at least one first light-emitting element and the at least one second light-emitting element to the corresponding one of the at least one first light-emitting element and the at least one second light-emitting element by referring to the information storage, and controlling, by a second control circuit of the lighting controller, a light emission period of the drive current to be supplied by the first control circuit in accordance with the determined light emission intensity.

14. The method for driving a light-emitting device according to claim 13, wherein:

the step of lighting, by the lighting controller, the plurality of first light-emitting elements and the plurality of second light-emitting elements comprises:

controlling, by the second control circuit, a light emission intensity by pulse-width modulation control while a drive current of each of the plurality of first light-emitting elements is kept constant, controlling, by the first control circuit, a light emission color by a current value for driving each of the plurality of second light-emitting elements, and controlling, by the second control circuit, luminance by a light emission period of the current value of each of the plurality of second light-emitting elements controlled by the first control circuit.

15. A light-emitting device comprising:

a display comprising a plurality of pixels in which a plurality of first light-emitting elements each configured to emit light of a first light emission color and a plurality of second light-emitting elements each configured to emit light of a second light emission color different from the first light emission color are arranged in a predetermined pattern;

a lighting controller comprising:

at least one first control circuit configured to supply a drive current to the first light-emitting elements and the second light-emitting elements, and at least one second control circuit configured to control a light emission period of the first light-emitting elements and the second light-emitting elements; and an information storage configured to store current-chromaticity information for determining a drive current value to drive each of the plurality of first light-emitting elements and the plurality of second light-emitting elements to emit light in accordance with a specific light emission color of each of the plurality of pixels, wherein:

the plurality of pixels include a first pixel comprising at least part of a first light-emitting element of the plurality of first light-emitting elements, and a distinct second light-emitting element of the plurality of second light-emitting elements, the second light emission color of the distinct second light-emitting element being variable in accordance with a drive current of the distinct second light-emitting element, the lighting controller is configured to control the plurality of first light-emitting elements and the plurality of second light-emitting elements based on the current-chromaticity information stored in the information storage so that each of the plurality of first light-emitting elements and the plurality of second light-emitting elements emits light of a specific light emission color and light emission luminance, the lighting controller is configured to:

determine a chromaticity of the second light emission color and a luminance ratio of the plurality of first light-emitting elements and the plurality of second light-emitting elements from a chromaticity signal and a luminance signal to be displayed by each pixel so as to correspond to the first light emission color, and determine a light emission intensity corresponding to a luminance signal to be displayed by the second light-emitting element based on the chromaticity of the second light emission color and the luminance ratio, the first control circuit is configured to supply a drive current having a value corresponding to a light emission color of each of the plurality of first light-emitting elements and the plurality of second light emitting elements to the corresponding one of the plurality of first light-emitting elements and the plurality of second light-emitting elements by referring to the information storage, and the second control circuit is configured to control a light emission period of the drive current supplied by the first control circuit in accordance with the determined light emission intensity.

16. A light-emitting device comprising:

a display comprising a plurality of pixels in which a plurality of first light-emitting elements each configured to emit light of a first light emission color and a plurality of second light-emitting elements each configured to emit light of a second light emission color different from the first light emission color are arranged in a predetermined pattern; and a lighting controller configured to supply a drive current to each of the plurality of first light-emitting elements and the plurality of second light-emitting elements and control a light emission period of each of the plurality of first light-emitting elements and the plurality of second light-emitting elements, wherein:

the plurality of pixels include a first pixel comprising at least part of a first light-emitting element of the plurality of first light-emitting elements, and a distinct second light-emitting element of the plurality of second light emitting elements, the light emission color of the distinct second light-emitting element being is variable in accordance with a drive current of the distinct second light-emitting element, wherein:

the lighting controller is configured to set a time width for supplying a current to each of the plurality of first light-emitting elements and the plurality of second light-emitting elements based on comparison between a first signal comprising a triangular wave signal and a first DC voltage set in a predetermined period, and the lighting controller is configured to control a current value to be supplied based on a second DC voltage set in a period different from the predetermined period.

* * * * *